(12) United States Patent
Lee

(10) Patent No.: US 11,922,443 B2
(45) Date of Patent: Mar. 5, 2024

(54) METHOD FOR PREDICTING DEMAND USING VISUAL SCHEMA OF PRODUCT, DEVICE THEREFOR AND COMPUTER PROGRAM THEREFOR

(71) Applicants: Hyun Jung Lee, Seoul (KR); Gibum Park, Seoul (KR)

(72) Inventor: Hyun Jung Lee, Seoul (KR)

(73) Assignees: Hyun Jung Lee, Seoul (KR); Gibum Park, Seoul (KR)

( * ) Notice: Subject to any disclaimer, the term of this patent is extended or adjusted under 35 U.S.C. 154(b) by 75 days.

(21) Appl. No.: 17/462,730

(22) Filed: Aug. 31, 2021

(65) Prior Publication Data
US 2022/0067763 A1 Mar. 3, 2022

(30) Foreign Application Priority Data
Sep. 2, 2020 (KR) .................. 10-2020-0111669

(51) Int. Cl.
*G06Q 30/00* (2023.01)
*G06N 3/00* (2023.01)
*G06N 3/08* (2023.01)
*G06Q 30/0204* (2023.01)

(52) U.S. Cl.
CPC ........... *G06Q 30/0204* (2013.01); *G06N 3/08* (2013.01)

(58) Field of Classification Search
CPC .............................. G06Q 10/00; G06Q 50/00
See application file for complete search history.

(56) References Cited

U.S. PATENT DOCUMENTS

| | | | |
|---|---|---|---|
| 11,232,511 B1* | 1/2022 | Zehr | G06V 20/70 |
| 11,580,585 B1* | 2/2023 | Rajana | G06Q 30/0627 |
| 2014/0172502 A1* | 6/2014 | Ryks | G06Q 30/0202 |
| | | | 705/7.31 |
| 2021/0103971 A1* | 4/2021 | Fox | G06N 5/04 |
| 2021/0264449 A1* | 8/2021 | Tsai | G06Q 30/0202 |
| 2021/0358593 A1* | 11/2021 | Laderman | G06N 20/00 |
| 2023/0109298 A1* | 4/2023 | Arnold | G06Q 30/0613 |
| | | | 705/27.2 |

* cited by examiner

*Primary Examiner* — Mustafa Iqbal
(74) *Attorney, Agent, or Firm* — Studebaker & Brackett PC

(57) ABSTRACT

The present disclosure relates to a method for predicting demand using a visual schema of a product, a device therefor, and a computer program therefor. The demand predicting method includes the operations of: creating visual schemas in which attributes of a product are digitized; analyzing the visual schemas and creating visual schema analysis data which are data relating to the attributes of the product; creating prediction data which are data obtained as a result of demand prediction analysis by attributes of the product using the visual schema analysis data; and creating visual narrative data expressing the prediction data into correlation between products or customers, and describing demand prediction.

12 Claims, 15 Drawing Sheets

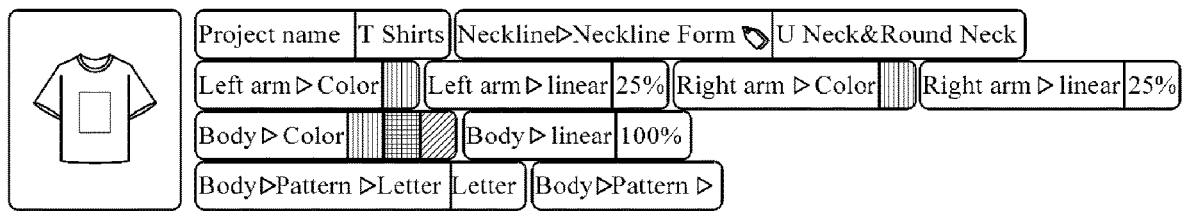

- Analogous
- Diad +pattern
- Triad +letter

- Analogous
- Diad +letter
- Split-Complementary +pattern

- Analogous
- Diad +pattern
- Split-Complementary +letter

- Analogous
- Complementary +pattern
- Triad +letter

- Analogous
- Diad +letter
- Split-Complementary +pattern

- Analogous
- Diad +letter
- Triad +pattern

- Analogous
- Monochromatic
- Split-Complementary +pattern

- Analogous
- Diad +pattern
- Split-Complementary +letter

- Analogous
- Monochromatic
- Triad +pattern

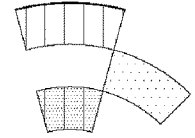
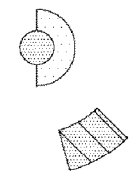

FIG. 8B
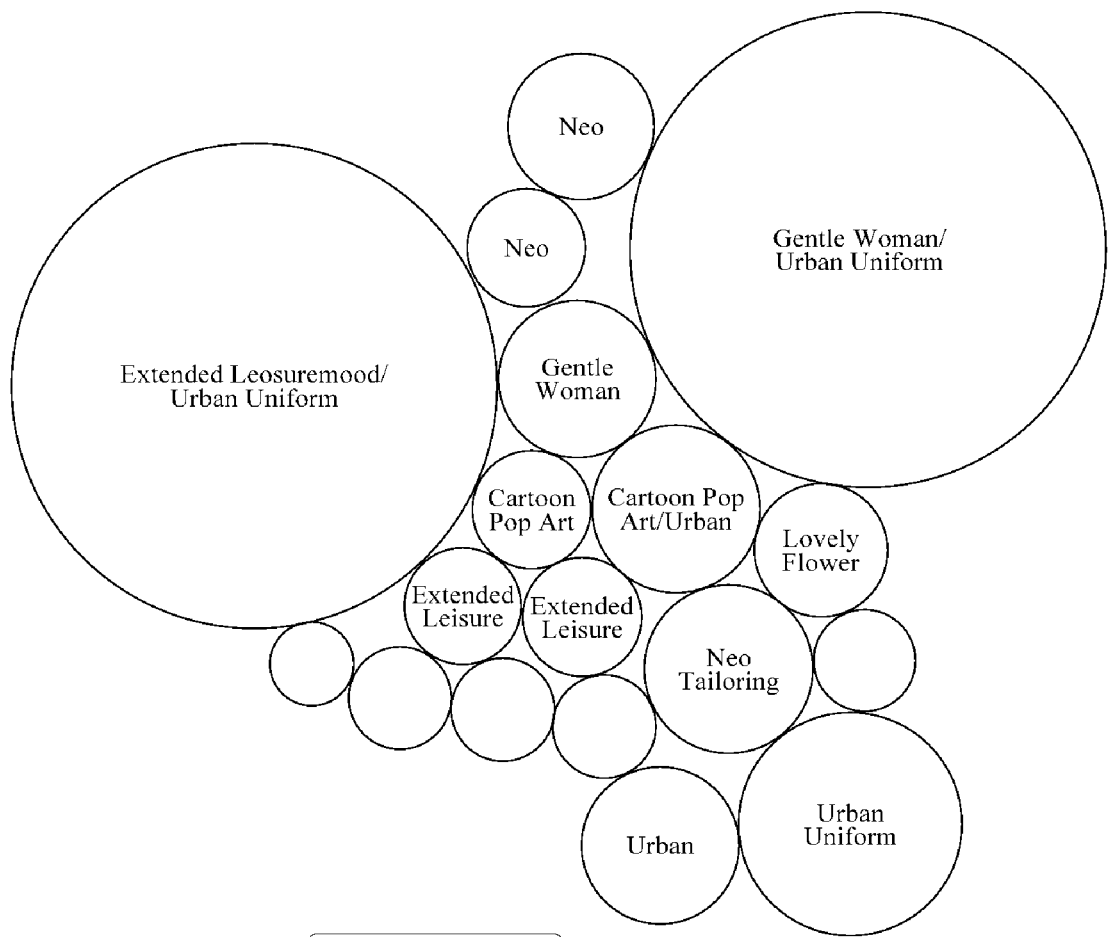
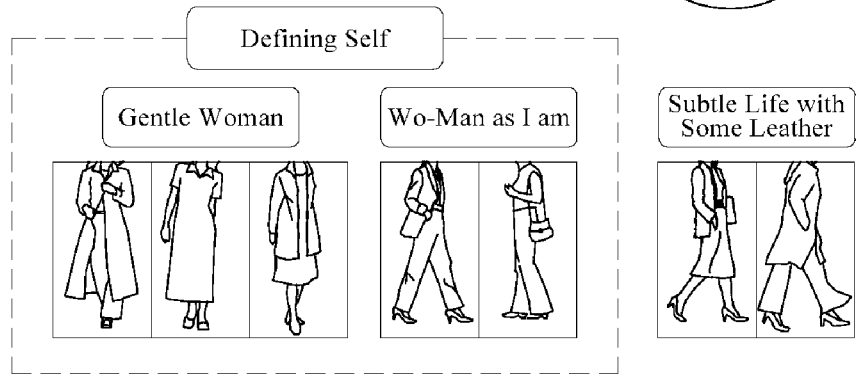
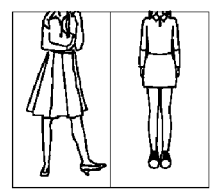
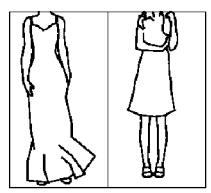

FIG. 9A

| Sequence (Node) | Left arm▷Pattern▷Letter ✓ | Left arm▷color | Left arm▷Length |
|---|---|---|---|
| Flow (Link) | Designer A | | |

| | Schema↓↑ | Value | ↓↑ Cases | ↓↑Percent |
|---|---|---|---|---|
| | ■ Designer | MiuMiu | 96 | 0.73% |
| | ■ Designer | Antonio Marras | 16 | 0.12% |
| | ■ Designer | Chanel | 135 | 1.02% |
| | ■ Designer | Wes Gordon | 32 | 0.24% |
| | ■ Designer | Jil Sander | 72 | 0.55% |
| | ■ Designer | No. 21(MENS) | 24 | 0.18% |
| | ■ Designer | Lacoste(mens) | 104 | 0.79% |
| | ■ Designer | Sportmax | 152 | 1.15% |
| | ■ Designer | Comme des Garçons | 45 | 0.34% |
| | ■ Designer | Versace | 96 | 0.73% |
| | ■ Designer | Carven | 210 | 1.59% |
| | ■ Designer | Mira Mikati | 56 | 0.42% |
| | ■ Designer | Isabel Marant | 184 | 1.39% |
| | ■ Designer | Y's Yohji Yamamoto | 112 | 0.85% |
| | ■ Designer | Stella McCarney | 168 | 1.27% |
| | ■ Designer | Victoria Victoria Beckham | 104 | 0.79% |
| | ■ Designer | Tommy Hilfiger | 112 | 0.85% |
| | ■ Designer | Mulberry | 128 | 0.97% |

FIG. 10A

Configuration of pattern
Sequence
    Sequence of elements in a pattern
    based on schema having position meta tags
    ex) Neckline→Body→Left arm→Right arm
    which is a single sequence not repeated Harmony
    Color group selected from color wheel by
    predetermined conditions
    Harmony type
        1. Monochromatic (E.g. white, gray, or black)
        2. Analogous (E.g. white and gray or gray and black)
        3. Complementary (E.g. white and black)
        4. Diad
        5. Split-Complementary
        6. Triad
        7. Rectangle (E.g. white, gray, and black)
        8. Square ( getting priority to Rectangle)

Which can be repeated and may multi-combination of harmony.
(Example of multi-combination: RGB (Triad) and CMY (Triad))
Minimum cost : Colour groups belonging to one harmony is not
interpreted as combinations of other harmony
(Example 1: Select only "Triad" but exclude combination of "Monochromatic")
(Example 2: Select only "Split-Complementary",
 but exclude combination of "Diad" and "Monochromatic")

Complementary
    Element except color, which substitutes the attribute of specific color

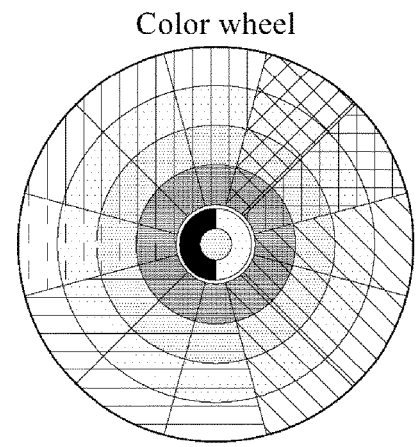

Color wheel

FIG. 10B

Cost modeling

Premise
- Clothing is designed by pattern of minimum cost. or pattern recognized by consumer from each clothing may be expalined by the minimum cost.
- Cost on choose (or repetition) of pattern elements (Harmony, Completmentary) increases linearly.
- Cost of pattern elements with the same type (Diad vs. Triad Harmony type) is the same.
- Pattern capable of explaining all colors presented in clothing.

Modeling
- Cost parameter by $C_h$ Harmony
  Repeated number by $x_h$ Harmony
- Cost parameter by $C_c$ Completmentary
  Repeated number by $x_c$ Completmentary
- Total cost = $\sum C_c x_c + \sum C_h x_h$ Cost pattern Modeling — Cost parameter — Clothing pattern extraction — Clothing pattern analysis (Intialization)    (Per page) (10 Case)

| No. | Pattern type | Pattern element | Cost Parameter |
|---|---|---|---|
| 29 | Complementary | string | 3 |
| 28 | Complementary | neck.half-high | 45 |
| 27 | Complementary | neck.round-or-u | 33 |
| 26 | Complementary | neck. unbalanced | 47 |
| 25 | Complementary | neck.square | 52 |
| 24 | Complementary | neck.henry | 53 |
| 23 | Complementary | neck.high | 54 |
| 22 | Complementary | neck.zip-up | 78 |
| 21 | Complementary | neck.hoodie | 82 |
| 20 | Complementary | neck.keyhole | 77 |

(Page) (Move)   |◁ ◁ 1 2 3 ▷ ▷|

METHOD FOR PREDICTING DEMAND USING VISUAL SCHEMA OF PRODUCT, DEVICE THEREFOR AND COMPUTER PROGRAM THEREFOR

CROSS-REFERENCE TO RELATED APPLICATION

A claim for priority under 35 U.S.C. § 119 is made to Korean Patent Application No. 10-2020-0111669 filed on Sep. 2, 2020 in the Korean Intellectual Property Office, the entire contents of which are hereby incorporated by reference.

BACKGROUND

1. Technical Field

The present disclosure relates to a method for predicting demand using a visual schema of a product, a device therefor, and a computer program therefor.

2. Description of Related Art

Currently, the big data market is in a mature stage of data collection through crawling, and now, it is necessary to predict and analyze product demand and preference through the analysis of data.

However, in order to quantitatively measure qualitative data, such as preference and demand, understanding of contexts through an analysis of contents is a prerequisite.

In particular, using image information of a product not having text but having visual information, it is impossible to carry out a contents analysis just by recognizing and counting attributes, and it is possible to make an analysis model capable of prediction and optimization only when relationship between the attributes is expressed numerically.

Finally, tools that can predict a consumer's demand and preference through an analysis of a relationship between attributes of products may be useful for business activities, and the market needs relevant tools.

The above information described in this background section is only provided to enhance the understanding of the background of the present disclosure and therefore it may contain information that does not form the related art that is already known to a person having ordinary skill in the field to which this technology pertains.

SUMMARY

The present disclosure has been made to solve the above-mentioned problems occurring in the prior art, and an aspect of the present disclosure is directed to providing a method for quantifying visual schema attributes to make a visual narrative form by expressing the relationship between product attributes in a consecutive fashion after creating a visual schema, which expresses product attributes numerically.

Moreover, the present disclosure is provided to analyze contents of a product image through quantification of attributes of the visual schema, and to utilize the analysis of the contents of such a product image to analyze a consumer's taste, preference and demand in the future.

Furthermore, the present disclosure is to establish a digitalized prediction and analysis modeling system, namely, an advanced CRM/ERP system, for a company's product planning and merchandizing activities through analysis of the consumer's taste and demand.

The aspects of the present disclosure are not limited to those mentioned above, and other aspects not mentioned herein will be clearly understood by those skilled in the art from the following description.

To accomplish the above aspects, a method for predicting demand using visual schemas of a product executed in a demand predicting device, the method including the steps of: creating visual schemas in which attributes of a product are digitized; analyzing the visual schemas and creating visual schema analysis data, which is data relating to the attributes of the product; creating prediction data, which is data obtained as a result of demand prediction analysis by attributes of the product using the visual schema analysis data; and creating visual narrative data expressing the prediction data into correlation between products or customers, and describing demand prediction.

Moreover, the step of creating the visual schemas comprises the steps of recognizing the attributes of the product based on an image analysis model, and creating the visual schemas.

Furthermore, the visual schema analysis data is data to express relationship between the attributes of the product and at least one among other attributes, consumers, trends, and costs, and the step of creating the visual schema analysis data includes a contents analysis action, a clustering action, and a neural network forming action.

Additionally, the step of creating the prediction data includes the steps of: expressing the relationship between the attributes of the product in visual narratives using a credit scoring model; calculating probability of how the visual narratives satisfy each area of the lifestyle map and a target audience's preference and demand; and ranking the calculated probabilities in sequence to predict demand for the product.

In addition, the step of describing demand prediction includes the steps of: replacing the visual schemas with wave data of time series, and creating the visual narrative data; and converting optokinetic processing into data using sequence nodes of the visual schemas in the image analysis model.

Moreover, the step of describing demand prediction includes the step of making a product model to satisfy consumer demand and preference using control and measurement of the visual schema sequence nodes.

In another aspect of the present disclosure, there is provided a demand predicting device including: a visual schema creation unit for creating visual schemas, which are data digitizing attributes of a product in numerical values; a visual schema analysis unit for analyzing the visual schemas and creating visual schema analysis data, which is data relating to the attributes of the product; a prediction unit for creating prediction data, which is data illustrating an analysis result of demand prediction by attributes of the product using the visual schema analysis data; and a description unit for creating visual narrative data expressing correlation between products or customers using the prediction data and for describing demand prediction.

Moreover, the visual schema creation unit recognizes attributes of the product based on an image analysis model and creates the visual schemas.

Furthermore, the visual schema analysis data is data to express the relationship between the attributes of the product and at least one among other attributes, consumers, trends, and costs, and the visual schema analysis unit analyzes and clusters contents and forms a neural network.

Additionally, the prediction unit expresses the relationship between the attributes of the product in visual narratives using a credit scoring model, calculates probability of how the visual narratives satisfy each area of the lifestyle map and a target audience's preference and demand, and ranks the calculated probabilities in sequence to predict demand for the product.

In addition, the description unit replaces the visual schemas with wave data of time series to create the visual narrative data, and converts optokinetic processing into data using sequence nodes of the visual schemas in the image analysis model.

Moreover, the description unit makes a product model to satisfy consumer demand and preference using control and measurement of the visual schema sequence nodes.

In another aspect of the present disclosure, there is provided a computer program stored in a storage medium readable by a computer, wherein the computer program executes a plurality of processes to predict demand using visual schemas of a product if it is executed by one or more processors, wherein the plurality of processes includes: a first process for creating visual schemas in which attributes of a product are digitized; a second process for analyzing the visual schemas and creating visual schemas, which is data relating to the attributes of the product; a third process for creating prediction data, which is data illustrating an analysis result of demand prediction by attributes of the product using the visual schema analysis data; and a fourth process for creating visual narrative data expressing correlation between products or customers using the prediction data and for describing demand prediction.

Furthermore, the first process recognizes attributes of the product based on an image analysis model and creates the visual schemas.

Additionally, the visual schema analysis data is data to express relationship between the attributes of the product and at least one among other attributes, consumers, trends, and costs, and the second process includes a contents analysis action, a clustering action, and a neural network forming action.

Moreover, the third process expresses the relationship between the attributes of the product in visual narratives using a credit scoring model, calculates probability of how the visual narratives satisfy each area of the lifestyle map and a target audience's preference and demand, and ranks the calculated probabilities in sequence to predict demand for the product.

Furthermore, the fourth process replaces the visual schemas with wave data of time series to create the visual narrative data, and converts optokinetic processing into data using sequence nodes of the visual schemas in the image analysis model. Additionally, the fourth process makes a product model to satisfy consumer demand and preference using control and measurement of the visual schema sequence nodes.

According to the embodiments as described above, it is possible to rapidly and effectively carry out modeling for predicting a consumer's demand and preference and optimizing a product through an analysis of relationships between attributes of the product.

The advantages of the present disclosure are not limited to the above-mentioned advantages, and other advantages, which are not specifically mentioned herein, will be clearly understood by those skilled in the art from the following description.

BRIEF DESCRIPTION OF THE DRAWINGS

FIG. 7 is a diagram illustrating a visual schema of a clothing line according to an embodiment of the present disclosure.

FIG. 8A is a diagram illustrating an analysis of contents among visual schema analysis data of the clothing line according to an embodiment of the present disclosure.

FIG. 8B is a diagram illustrating a clustering analysis of the visual schema analysis data of the clothing line according to an embodiment of the present disclosure.

FIGS. 9A and 9B are diagrams illustrating demand prediction data of the clothing line according to an embodiment of the present disclosure.

FIGS. 10A and 10B are diagrams illustrating visual narratives according to an embodiment of the present disclosure.

DETAILED DESCRIPTION

Figure 1:
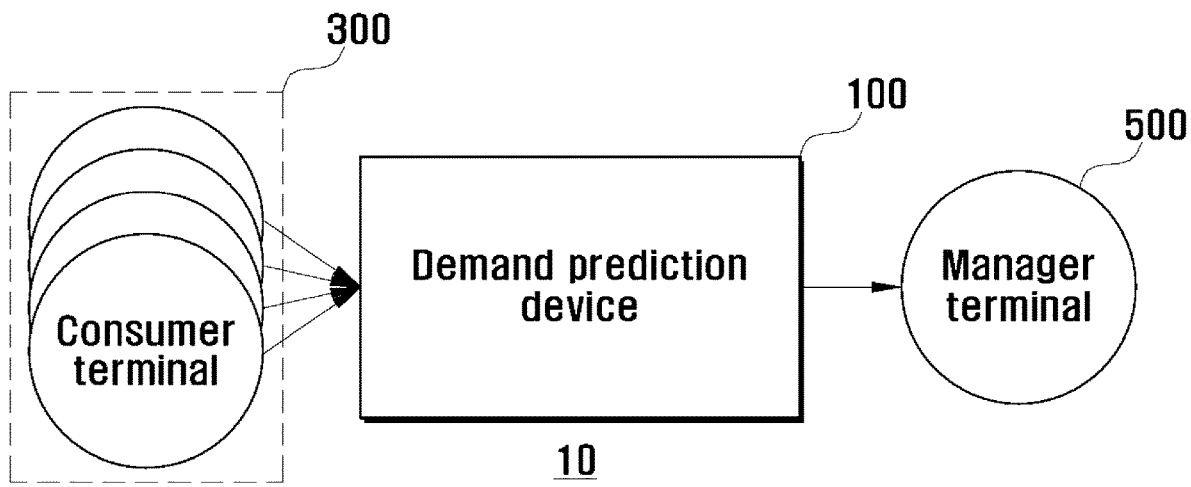
FIG. 1 is a diagram illustrating a demand predicting system using a visual schema of a product according to an embodiment of the present disclosure.

Hereinafter, an embodiment will be described in detail with reference to the accompanying drawings. In the drawings, the same components have the same reference numerals. It should be noted that the following embodiments may be implemented in various different forms. It should be understood that there is no intent to limit the following embodiments to the particular forms disclosed, but on the contrary, the embodiments are to cover all modifications, equivalents, and alternatives falling within the technical idea and scope of the present invention.

Terms used in the specification are used to describe specific embodiments of the present disclosure and are not intended to limit the scope of the present disclosure. In the specification, the terms of a singular form may include plural forms unless otherwise specified. The expressions "comprise" and/or "comprising" used herein indicate existence of one or more other elements other than stated elements but do not exclude presence of additional elements. Like reference denotations refer to like elements throughout the specification.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Throughout the attached drawings, the same components have the same reference numerals, and repetitive description thereof will be avoided. Detailed descriptions of known relevant art which have been deemed to make the gist of the present invention unnecessarily obscure will be omitted below.

FIG. 1 is a diagram illustrating a demand predicting system using a visual schema of a product according to an embodiment of the present disclosure.

Referring to FIG. 1, a demand predicting system 10 using a visual schema of a product according to an embodiment of the present disclosure includes a demand predicting device 100, a consumer terminal 300, and a manager terminal 500.

The demand predicting device 100 is one among electronic devices, such as computers, ultra mobile PCs (UMPCs), workstations, net-books, personal digital assistants (PDAs), portable computers, web tablets, wireless phones, mobile phones, smart phones, and portable multimedia players (PMPs), and includes all kinds of electronic devices capable of installing and executing applications related to the demand predicting device 100. The electronic device can execute operations of all services, such as the composition of service images, data input, and data sending and receiving, under control of the applications.

The demand predicting device 100 creates a visual schema 20 of a product. The visual schema 20 of the present disclosure is data that digitizes attributes of the product.

For instance, in case that the product is in a clothing line, the demand predicting device 100 can digitize colors, patterns, a neck line, an arm length, thickness, and other elements, which are attributes of the clothing line, and create the visual schema 20.

The demand predicting device 100 can recognize the attributes of the product and create the visual schema 20 of the product using an image analysis model. The image analysis model of the present disclosure may include image recognition and analysis model of various ways.

The demand predicting device 100 analyzes the visual schema 20 and creates a visual schema analysis data 30.

The visual schema analysis data 30 of the present disclosure is data that analyzes how the attributes of the product are related to one another to have a specific pattern, and data illustrating relationship between the attributes of the product with other attributes, consumers, trends, costs, and others.

The demand predicting device 100, which can analyze the visual schema 20 using various methods, can analyze the visual schema 20 through contents analysis, clustering, and neural network configuration.

The demand predicting device 100 analyzes demand prediction using the visual schema analysis data 30, and creates prediction data 40 which is an analysis result.

The prediction data 40 of the present disclosure is data that predicts consumer demand by visual schema of the product.

The demand predicting device 100 can execute an analysis of demand prediction using various analysis methods. The demand predicting device 100 according to an embodiment of the present disclosure expresses relationship between product attributes in a narrative way using a credit scoring model, calculates probabilities that the corresponding visual narrative satisfies areas in each lifestyle map and target audience's preference and demand and ranks the calculated results in sequence in order to predict demand of the corresponding product.

The demand predicting device 100 creates visual narrative data 50 using the prediction data 40. The visual narrative data 50 of the present disclosure is data that expresses the prediction data 40 into correlation between products or between consumers. Through the visual narrative data 50, a product-optimized model that meets the consumer's demand and preference can be made.

The demand predicting device 100 can create the visual narrative data 50 using various methods. The demand predicting device 100 according to an embodiment of the present disclosure can create the visual narrative data 40 through creation of visual narratives and optokinetic processing.

Hereinafter, referring to FIG. 2, the configuration and functions of the demand predicting device 100 will be described in detail.

The consumer terminal 300 transmits product purchase data to the demand predicting device 100. The product purchase data is used to predict demand of the corresponding product in the demand predicting device 100.

The manager terminal 500 receives the prediction data 40 and the visual narrative data 50 from the demand predicting device 100, and outputs the corresponding data to a manager who is a user. The manager may confirm the consumer's taste and demand using the corresponding data, and refer to the consumer's taste and demand for product planning and merchandizing activities of a company.

Figure 2:
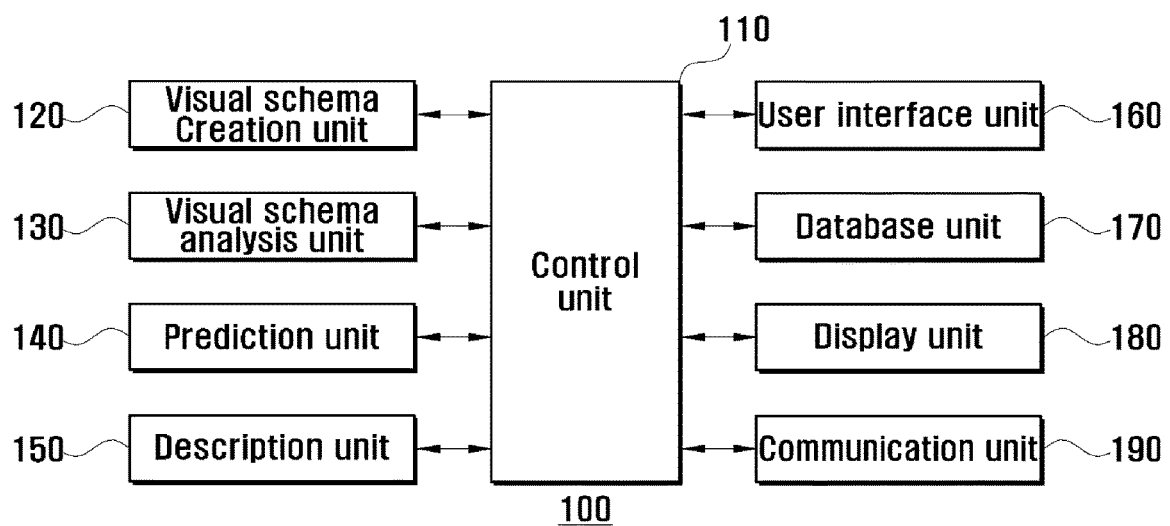
FIG. 2 is a diagram illustrating a configuration of a demand predicting device according to an embodiment of the present disclosure.

FIG. 2 is a diagram illustrating a configuration of the demand predicting device 100 according to an embodiment of the present disclosure.

Referring to FIG. 2, the demand predicting device 100 according to the embodiment of the present disclosure includes a control unit 110, a visual schema creation unit 120, a visual schema analysis unit 130, a description unit 150, a prediction unit 140, a user interface unit 160, a database unit 170, a display unit 180, and a communication unit 190.

Communication among various entities contained in the demand predicting device 100 may be carried out through wire/wireless networks (not shown). The wire/wireless networks may use standard communication technology and/or protocols.

Hardware of the demand predicting device 100 may be embodied in various fashions. Such hardware may be configured by a combination of the visual schema creation unit 120 and the visual schema analysis unit 130 or a combination of the description unit 150 and the prediction unit 140. As described above, the configuration of the hardware of the demand predicting device 100 is not limited to the above description of this specification but may be embodied by various methods and combinations.

The control unit 110 controls the visual schema creation unit 120, the visual schema analysis unit 130, the description unit 150, the prediction unit 140, the user interface unit 160, the database unit 170, the display unit 180, and the communication unit 190 so that the demand predicting device 100 can execute various functions.

Furthermore, the control unit 110 may be called a processor, a controller, a microcontroller, a microprocessor, a microcomputer or the like, and may be embodied by hardware or firmware and software or by a combination of hardware, firmware and software.

The visual schema creation unit 120 creates a visual schema 20 of a product. The visual schema 20 of the present disclosure is data that digitizes attributes of a product.

For instance, in case of a clothing line, the visual schema creation unit 120 digitizes colors, patterns, neck lines, arm lengths, arm thicknesses, and others which are the attributes of the clothing line, and creates the visual schema 20.

The visual schema creation unit 120 recognizes the attributes of the product using the image analysis model, and creates the visual schema 20 of the product. The image analysis model of the present disclosure may include image recognition and analysis model of various ways.

The demand predicting device 100 analyzes the visual schema 20 and creates a visual schema analysis data 30.

The visual schema analysis data 30 of the present disclosure is data that analyzes how the attributes of the product are related to one another to have a specific pattern, and data illustrating relationship between the attributes of the product with other attributes, consumers, trends, costs, and others.

The demand predicting device 100, which can analyze the visual schema 20 using various methods, can analyze the visual schema 20 through contents analysis, clustering, and neural network configuration.

Figure 3:
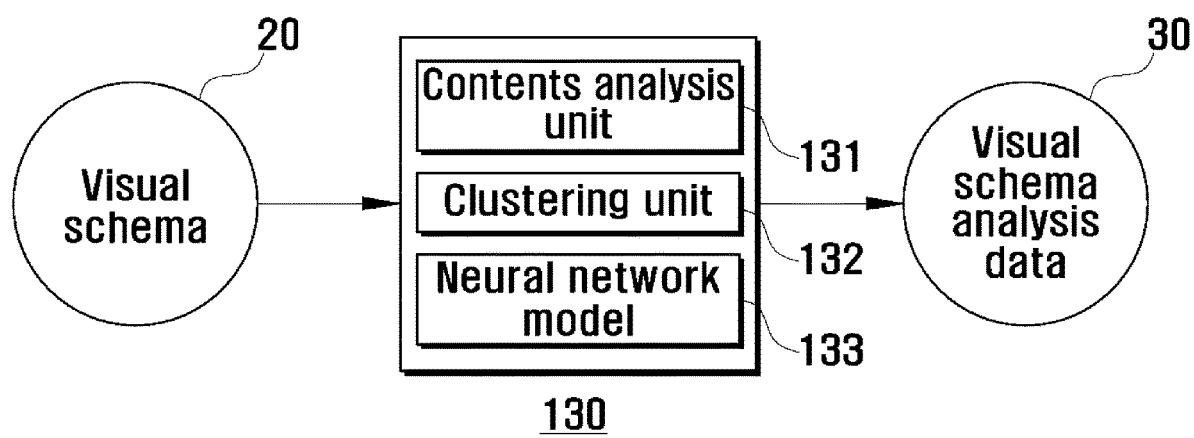
FIG. 3 is a diagram illustrating a configuration of a visual schema analysis unit according to an embodiment of the present disclosure.

FIG. 3 is a diagram illustrating a configuration of the visual schema analysis unit 130 according to an embodiment of the present disclosure. Referring to FIG. 3, the visual schema analysis unit 130 according to the embodiment of the present disclosure includes a contents analysis unit 131, a clustering unit 132, and a neural network model 133.

The contents analysis unit 131 carries out an implicit measurement via content-based analysis in order to immanently grasp a consumer's attitude to the product through a content-based analysis contained in the product. The contents analysis unit 131 is to grasp implicit consumer preference to a product and a trend through the analysis of contents.

The clustering unit 132 clusters products by the corresponding contents after finishing the contents analysis of the product, matches the corresponding clustered contents to a consumer's value and opinion on the product, and carries out clustering through a psychographic description of the consumer.

The neural network model 133 forms the attributes of the product and preference to the corresponding attributes in the form of a neural network. The neural network model 133 creates the neural network form to infer and describe complexity between the attributes of the product and the preference. Thus, a relation pattern (contents) between the visual schemas in the product optimization model expressed by the visual narratives of the description unit is replaced with a combination (connectome) between nodes of the neural network, and machine reinforcement learning is carried out, so that the present disclosure can learn the consumer's specific preference to a product through the relation pattern between the visual schemas.

The prediction unit 140 carries out an analysis of demand prediction using the visual schema analysis data 30, and creates the prediction data 40 which is an analysis result. The prediction data 40 of the present disclosure is data that predicts a consumer's demand by visual schema of a product.

The prediction unit 140 can carry out an analysis of demand prediction using various analysis methods. The demand predicting device 100 of the present disclosure expresses relationship between product attributes in a narrative way using a credit scoring model, calculates probabilities that the corresponding visual narrative satisfies areas in each lifestyle map and target audience's preference and demand and ranks the calculated results in sequence in order to predict demand of the corresponding product.

The description unit 150 creates the visual narrative data 50 using the prediction data 40. The visual narrative data 50 of the present disclosure is data that expresses the prediction data 40 into correlation between products or between consumers. That is, the visual narrative data 50 that expresses the consumer's preference and demand for the relation pattern between the product visual schemas is data capable of simulating and modeling a product-optimized model that meets the consumer's demand and preference through control and measurement of product attributes (schemas).

The description unit 150 can create the visual narrative data 50 using various methods. The demand predicting device 100 of the present disclosure can create the visual narrative data 40 through creation of visual narratives and optokinetic processing.

Figure 4:
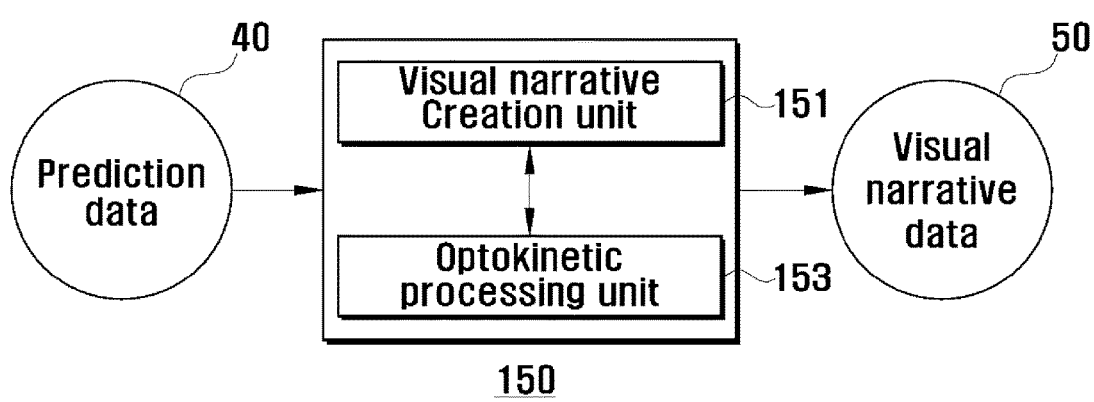
FIG. 4 is a diagram illustrating a configuration of a description unit according to an embodiment of the present disclosure.

FIG. 4 is a diagram illustrating a configuration of the description unit 150 according to an embodiment of the present disclosure. Referring to FIG. 4, the description unit 150 according to the embodiment of the present invention includes a visual narrative creation unit 151, and an optokinetic processing unit 153.

The visual narrative creation unit 151 replaces image data having the visual schema with wave data of the passage of time, and creates visual narratives.

The optokinetic processing unit 153 replaces optokinetic processing with data using sequence nodes of the image visual schema 20 in the image analysis model.

The optokinetic processing unit 153 digitizes or visualizes features (tool for immanently grasping and measuring a consumer's preference to the corresponding product) of the product through a continuous expression way, such as frequencies or the likes. A difference in numerical value between such product attributes is expressed by the continuous way like frequencies.

The optokinetic processing unit 153 simulates a consumer's optokinetic motions in relation to combination patterns among items (visual schemas) of products that are popular and are in high demand in a specific lifestyle area, so as to grasp items meeting the consumer's preference and an optimized connection method (visual schema sequence) of the items (visual schemas). Additionally, descriptions of visual schemas and visual narratives illustrated in FIGS. 10A and 10B which will be described later are finished when the optokinetic processing unit 153 measures the consumer's recognition cost for each product item (visual schema) while simulating the consumer's optokinetic motions. The system replaces the visual schema sequence is replaced with a combination pattern (connectome) between nodes of the neural network illustrated in FIG. 8C, so that the prediction unit according to an embodiment of the present disclosure can grasp relationship among product items (visual schemas) capable of satisfying consumers' preference and needs for a specific product and predict future preference and demand.

The user interface unit 160 provides users with an interface capable of inputting data. Users can input various kinds of data to the demand predicting device 100 through the interface unit 160.

The database unit 170 stores various kinds of data which are necessary for the demand predicting device to create the prediction data 40. For instance, the database unit 170 can store the visual schema 20, the visual schema analysis data 30, the prediction data 40, and the visual narrative data 50.

The display unit 180 outputs data stored in the demand predicting device 100 to users through a display device. For example, the display unit 180 can output the visual schema 20, the visual schema analysis data 30, the prediction data 40, and the visual narrative data 50 to users.

The communication unit 190 carries out data communication with external devices. The communication unit 190 can receive product purchase data and/or product preference data from the consumer terminal 300, and transmit the prediction data 40 and the visual narrative data 50 to the manager terminal 50.

Figure 5:
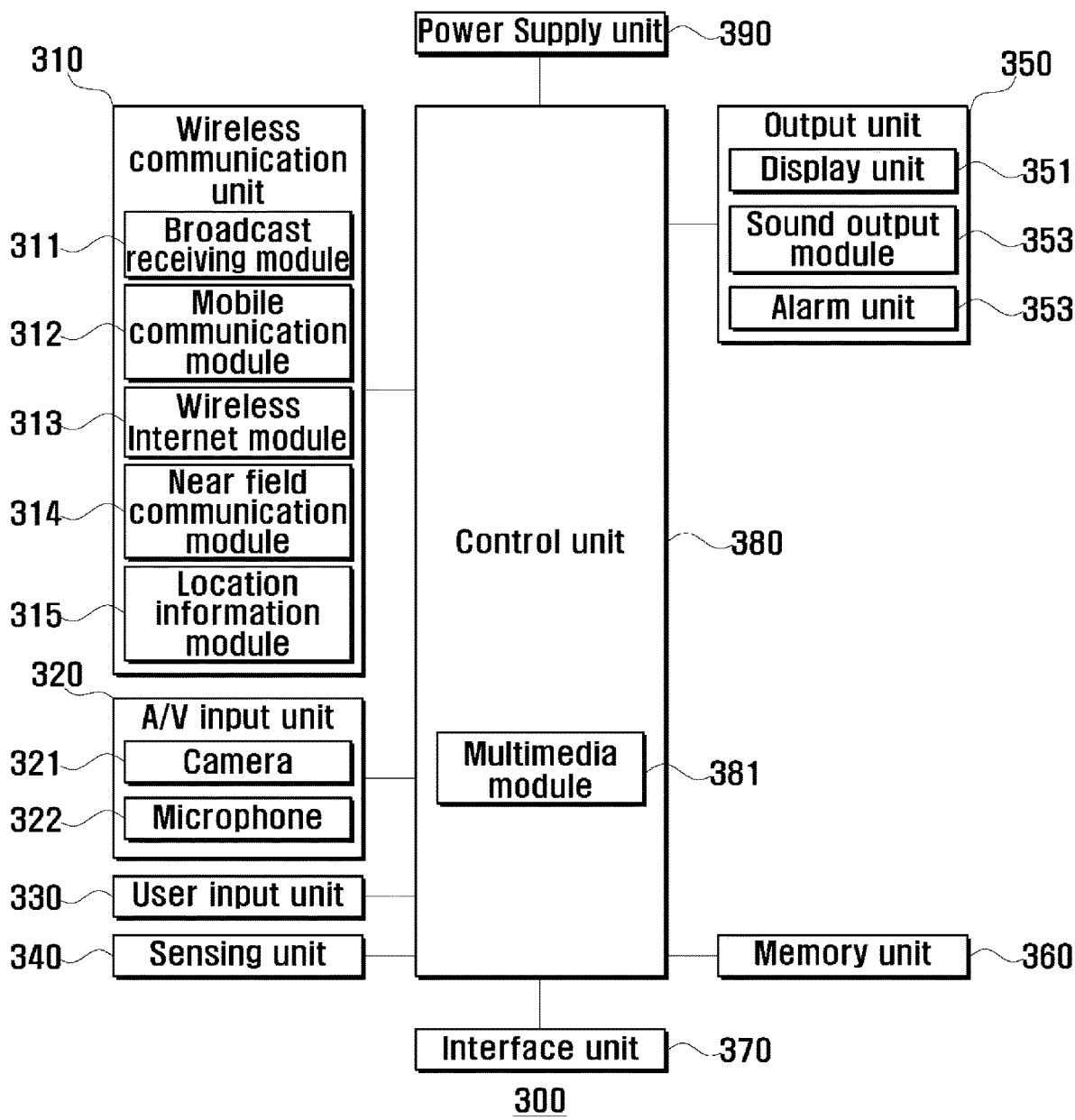
FIG. 5 is a diagram illustrating a configuration of a consumer terminal according to an embodiment of the present disclosure.

FIG. 5 is a diagram illustrating a configuration of the consumer terminal 300 according to an embodiment of the present disclosure.

Hereinafter, components of the consumer terminal 300 illustrated in FIG. 5 will be described in detail. FIG. 5 illustrates the consumer terminal 300, but the manager terminal 00 has the same configuration as the consumer terminal 300.

The wireless communication unit 310 may include at least one component carrying out wireless communication between the consumer terminal 300 and a wireless communication system or wireless communication between the consumer terminal 300 and a network of the consumer terminal 300. For instance, the wireless communication unit 310 may include a broadcast receiving module 311, a mobile communication module 312, a wireless Internet module 313, a near field communication module 314, a location information module 315, and the likes.

The broadcast receiving module 311 receives broadcast signals and/or broadcast-related information from an external broadcast management server through a broadcast channel. Here, the broadcast channel may include satellite channels and terrestrial channels. Meanwhile, the broadcast-related information may be provided through a mobile communication network, and in this instance, may be received by the mobile communication module 312.

In addition, the mobile communication module 312 sends and receives a wireless signal with at least one among a base station, an external terminal, and a server on the mobile communication network. Here, the wireless signal may contain data of various forms according to sending and receiving of speech call signals, video call signals or text/multimedia messages.

The wireless Internet module 313 means a module for wireless Internet connection, and may be built in the consumer terminal 300 or built outside the consumer terminal 300.

The near field communication module 314 means a module for near field communication. Near field communication technology may be one among Bluetooth, radio frequency identification (RFID), infrared data association (IrDA), ultra wideband (UWB), ZigBee, and others.

Moreover, the location information module 115 is a module for confirming or obtaining a location of the consumer terminal 300. For example, the location information module 115 may be a global position system (GPS). The GPS module receives location information from a plurality of satellites. Here, the location information may contain coordinate information indicated by latitude and longitude.

Meanwhile, an A/V (Audio/Video) input unit 320 which is to input audio signals or video signals may include a camera 321 and a microphone 322. The camera 321 processes image frames of static images or moving images obtained by an image sensor in a video call mode or a filming mode. Furthermore, the processed image frames may be displayed on the display unit 351.

The image frames processed in the camera 321 may be stored in a memory 360 or transmitted to the outside through the wireless communication unit 310. Two or more cameras 321 may be disposed according to the configuration of the consumer terminal 300.

The microphone 322 receives an external acoustic signal by the microphone in a call mode, a recording mode, or a speech recognition mode and processes the acoustic signal into electric audio data. Moreover, the processed audio data is converted and outputted into a form capable of being transmitted to a mobile communication base station through the mobile communication module 312 in the call mode. The microphone 322 can realize a noise removal algorithm for removing noise generated when receiving the external acoustic signal.

The user input unit 330 receives a user's input action from the user and generates input data to control operation of the consumer terminal 300.

A sensing unit 340 senses the present state of the consumer terminal 300, such as a location of the consumer terminal 300, user contact or noncontact, a bearing of the consumer terminal 300, and acceleration/deceleration of the consumer terminal 300, and generates a sensing signal for controlling operations of the consumer terminal 300.

The interface unit 370 serves as an interface for all external devices connected to the consumer terminal 300. For example, the interface unit 370 may be a wire/wireless headset port, an external charger port, a wire/wireless data port, a memory card port, a port for connecting a device having an identity module, an audio input/output (I/O) port, a video input/output (I/O) port, an earphone port, and others.

The output unit 350 is to output audio signals, video signals, or alarm signals, and may include a display unit 351, a sound output module 352, an alarm unit 353, and so on.

The display unit 351 displays and outputs information processed in the consumer terminal 300. For example, in case that the consumer terminal 300 is in the call mode, the display unit 351 displays a user interface (UI) or a graphic user interface (GUI) relating to a call. Furthermore, in case that the consumer terminal 300 is in a video call mode or in a filming mode, the display unit 351 displays a filmed and/or received image or a UI or a GUI.

Meanwhile, as described above, in case of a touch screen that the display unit 351 and a touch pad are in a layer structure, the display unit 351 may be used not only as an output device but also as an input device. The display unit 351 includes at least one among a liquid crystal display, a thin film transistor-liquid crystal display, an organic light-emitting diode, a flexible display, and a 3D display. Moreover, according to implementation forms of the consumer terminal 300, there may be two or more display units 351. For instance, the consumer terminal 300 includes an external display unit (not shown) and an internal display unit (not shown) at the same time.

The sound output module 352 outputs audio data received from the wireless communication unit 310 or stored in the memory 360 in a call signal receiving mode, a call mode, a recording mode, a speech recognition mode, or a broadcast receiving mode. Additionally, the sound output module 352 output sound signals relating to functions performed in the consumer terminal 300, for instance, call signal incoming sound, message incoming sound. Such a sound output module 352 includes a speaker, a buzzer, and so on.

The alarm unit 353 outputs a signal for informing event generation of the consumer terminal 300. Events generated from the terminal are, for example, reception of a call signal, reception of a message, input of a key signal, and so on.

The memory 360 can store programs for processing and controlling the control unit 380 and serve to temporarily store inputted or outputted data, for example, phonebooks, messages, static images, or moving images.

The memory 360 includes one or more storage media among a flash memory type memory, a hard disk type memory, a multimedia card micro type memory, a card type memory such as an SD memory or an XD memory, a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The control unit 380 usually controls overall operations of the terminal, and performs control and processing relating to, for instance, voice calls, data communication, and video calls. Moreover, the control unit 380 includes a multimedia module 181 for playing multimedia. The multimedia module 381 may be built in the control unit 380 or may be mounted separately from the control unit 380.

A power supply unit 390 receives an external power supply or an internal power supply by a control of the control unit 380 and supplies power necessary for operations of the components.

Figure 6:
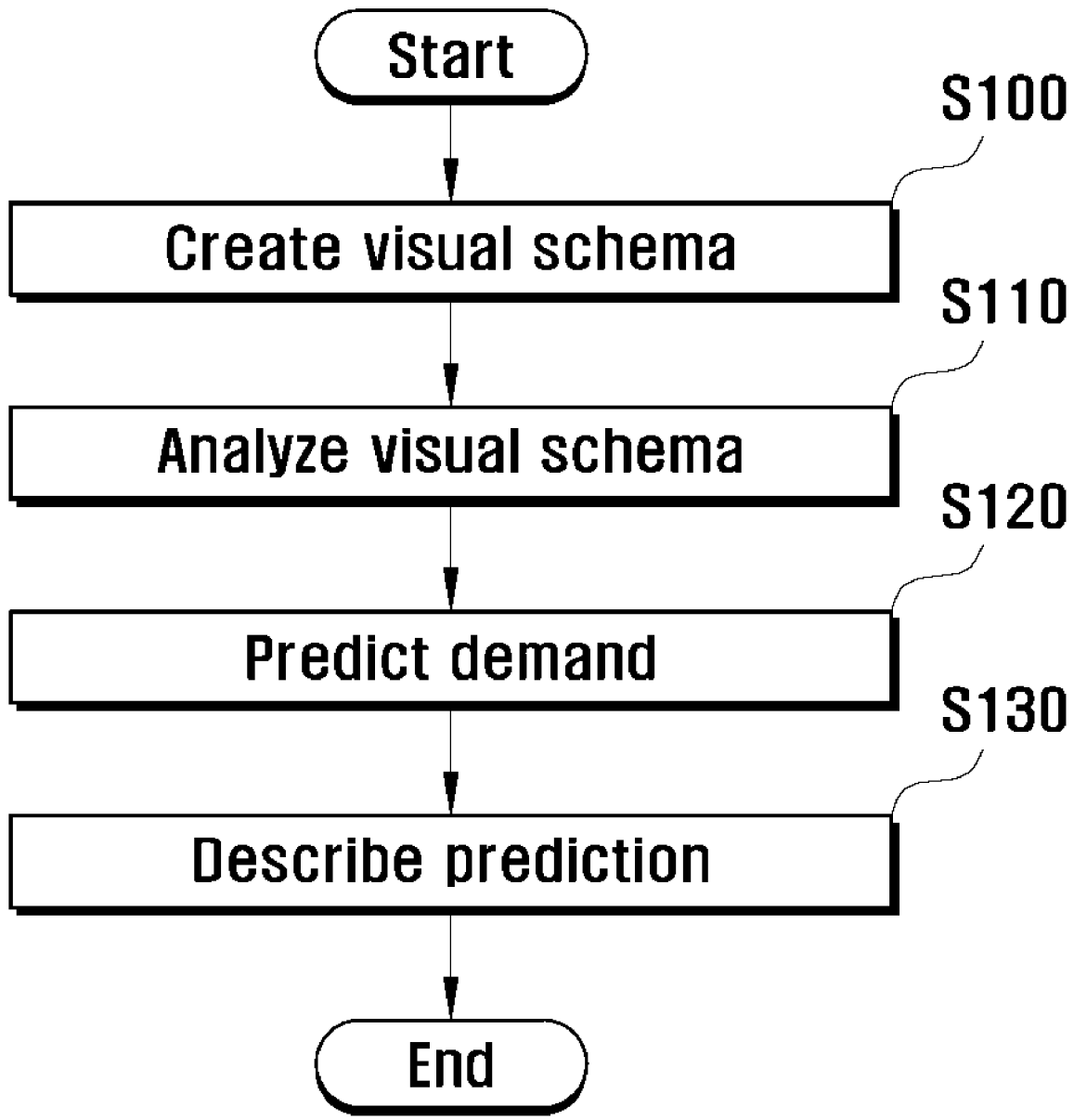
FIG. 6 is a flow chart illustrating a method for predicting demand using a visual schema of a product according to an embodiment of the present disclosure.

FIG. 6 is a flow chart illustrating a method for predicting demand using a visual schema of a product according to an embodiment of the present disclosure.

Referring to FIG. 6, the method for predicting demand using a visual schema of a product according to an embodiment of the present disclosure includes the steps of creating a visual schema (S100), analyzing the visual schema (S110), predicting demand (S120), and describing the prediction of demand (S130).

First, in the step of creating a visual schema (S100), the visual schema creation unit 120 recognizes attributes of a product schema and creates a visual schema 20.

Figure 7:
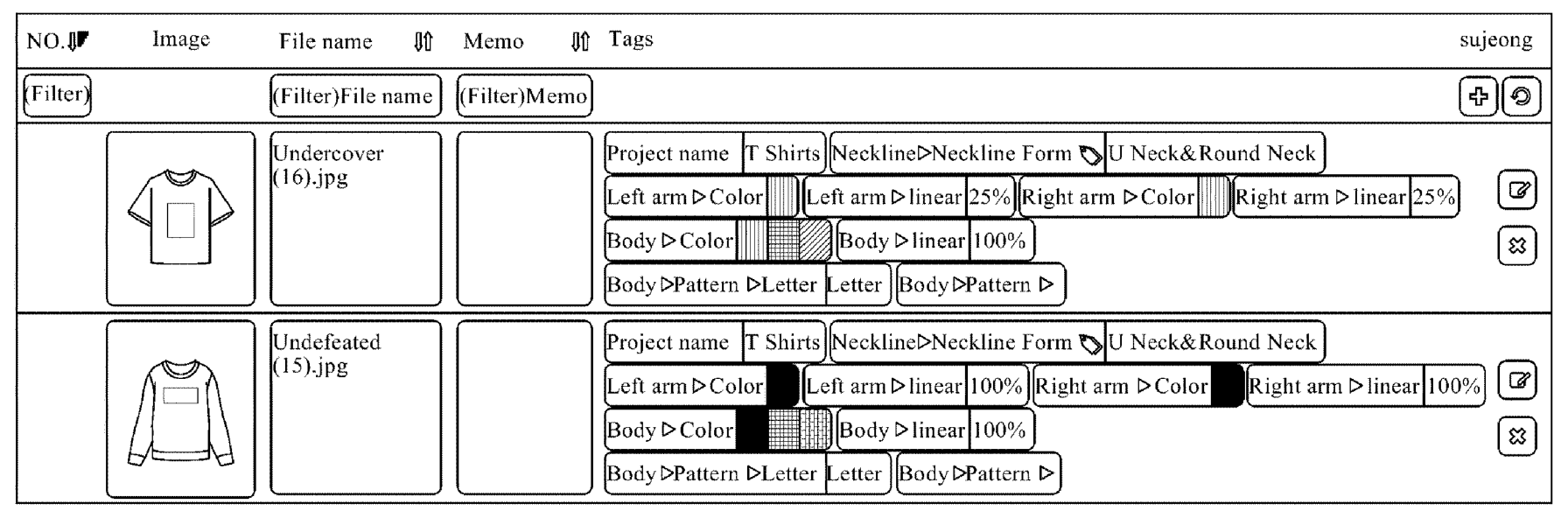

FIG. 7 is a diagram illustrating a visual schema of a clothing line according to an embodiment of the present disclosure.

Additionally, in the step of analyzing the visual schema (S110), the visual schema analysis unit 130 analyzes the visual schema 20 created in the visual schema creation unit 120 and creates visual schema analysis data.

As described above, the visual schema analysis data is data that analyzes relationship among an attribute of a product and other attributes, product clients, trends, costs, and so on.

FIG. 8A is a diagram illustrating an analysis of contents among visual schema analysis data of the clothing line according to an embodiment of the present disclosure.

Hereinafter, the step of analyzing the visual schema (S110) will be described in detail.

First, the contents analysis unit 131 analyzes a pattern of the product through contents. The method for analyzing the pattern of the product through contents according to an embodiment of the present disclosure may be implemented in various ways, and is not limited to the following method.

The present disclosure is to fundamentally build an advanced CRM tool through a prediction modeling to predict product demand and preference through an implicit measurement via a content-based analysis that grasps a consumer's attitude to a product through the content-based analysis which is implicit in the product.

The present disclosure grasps consumer's preference to products and trends through the implicit contents analysis, predicts consumers' future preference to product attributes and trends of product attributes, and allows development of demand prediction tools and merchandizing optimization tools relative to the trends and individual products.

Behaviors and philosophies for contents analysis vary according to domains of knowledge. They systematically read or observe texts and artifacts having labels or codes that show existence of important and interesting parts in contents.

The contents analysis is study methodology to study communication artifacts, such as documents, texts of various formats, images, audios and videos. Social scientists use contents analysis in order to find patterns for reproducible and systematic communication. A great advantage of the contents analysis in analyzing social phenomena is that the analysis method is noninvasive. In contrast, a method to simulate a social experiment or to reply to survey items is an invasive method.

Behaviors and philosophies for contents analysis vary according to domains of knowledge. They systematically read or observe texts and artifacts having labels or codes that show existence of important and interesting parts in contents.

In order to systematically analyze contents of a series of texts, a statistical method may be used to quantitatively analyze patterns of contents or a qualitative method may be used to analyze meanings of contents in texts.

That is, there are the qualitative method and the quantitative method to analyze contents, and the two methods have advantages and disadvantages.

The quantitative contents analysis is currently very popular because research results of popular culture and individualized communication are applied to the quantitative contents analysis through a step forward in technology. Especially, contents analysis of lots of text-based big data produced through SNS and mobile devices is very popular. However, such methods take a simple approach to language which overlooks complexity of a "symbol phenomenon" that "meaning" is formed outside language (text).

So, the quantitative contents analysis has been criticized in limiting the scope of the contents analysis just by simply counting individual words and in applying the measurement methodology of natural science regardless of appropriacy of social science.

On the contrary, the qualitative contents analysis has been criticized in lacking systematization and in analyzing based on impression without the basis of facts or reasons.

In order to strengthen the advantages and make up for the disadvantages of the quantitative contents analysis and the qualitative contents analysis, qualitative data of "meaning and context" must be changed into quantitative data by being digitized in relationship between attributes. That is, meanings and contexts must be coded to analyze qualitative codes beyond the simple quantitative contents analysis that performs counting of the corresponding codes of simply coded words, so as to predict directionality of general trends and preference.

In one embodiment, relations between data attributes (features and contents of data) are replaced with codes and labels for analyzing contents, so as to predict trend demand and preference through analysis of corresponding contents.

In order code qualitative data (meaning and context), the attributes of a product and preference of the corresponding attribute must be made in the form of a neural network. The present disclosure can infer and describe complexity between the attributes and preference of the product through such a neural network form.

That is, the attributes of a product and a consumer's preference to the attributes must be understood in the frame of communication, and implicit meanings and contexts of the corresponding communication must be inferred through the contents analysis.

The Holsti group divided the contents analysis into three categories. Through the three categories of the contents analysis, it is possible to extract a manual (algorithm) capable of predicting demand relative to coding (quantization) of qualitative data and optimizing merchandizing (product) and to digitalize, systemize and automatize the corresponding algorithm to develop an AI analytical CRM-ERP system.

First, in order to infer prerequisites for carrying out communication, simulate combination kinds and the degrees of combination between attributes to create a pattern, namely, a connectome, in the neural network.

Second, infer and describe features of communication. Infer and describe a path and an algorithm (flow chart) of consumers' responses to a combination of specific attributes, for instance, a connection of the combination of the specific attributes to specific preference requisite and royalty condition.

Third, infer effects of communication. Rank how the number of cases of combination of attributes which match a checklist for forming specific consumer preference and royalty on a product is effective at optimizing merchandizing. That is, in consideration of features of the neural network, strengthen the corresponding combination (connectome) so that combination of specific attributes satisfies consumers' needs in a specific lifestyle map area. If satisfaction of the needs for the combination of specific attributes is proved through calculation of sales and trend indexes, scores of the combination of the corresponding specific attributes get higher.

Through adding-up of the scores, merchandizing optimization ranking in the specific lifestyle map area by combination of specific attributes is estimated.

The merchandizing optimization can be achieved by predicting demand of a product created in the lifestyle map area of each target audience and optimizing the corresponding product, analyzing the meanings and contexts of symbolic attributes, which can form a consumer's royalty, and an attribute optimization pattern through the contents analysis in the lifestyle map area, and optimizing a combination of the symbolic attributes with the corresponding product which creates demand.

Moreover, the clustering unit 132 clusters products by the corresponding contents after finishing the contents analysis of products, matches the corresponding clustered contents to a consumer's value and opinion on the product, and carries out clustering through a psychographic description of the consumer.

By matching product information to preference information through visual narratives, the present disclosure can develop a content-based recommendation algorithm of products, especially, fashion products.

Psychography is a qualitative method used to describe human characteristics on psychological properties. Psychography has been greatly utilized to studies on personalities, values, opinions, attitudes, interest, and lifestyles.

Psychographic properties are contrasted to demographic variables, such as age and gender, and has become very popular in marketing since psychological variables, such as values or lifestyles, are more effective in product optimization and demand/preference prediction than the demographic variables.

When a universal and integrated profile on psychographic factors (psychological properties) of a person or a group is formed, it is called a "psychographic profile". The psychographic profile is used to market segmentation as well as advertisement.

The present disclosure is to make a psychographic profile on product attributes and consumer preference in an area where the consumer's lifestyle map is made in the form of a neural network, a description model by consumer segments relative to the corresponding profile, and a company's prediction model, which will be utilized to marketing and business activities in relation to the corresponding consumer segments, by matching contents (visual narrative codes) of product attribute relationship and psychographic factors, such as preference and purchase intention of the product contents.

That is, when a path and an algorithm (flow chart) of consumers' responses to a combination of specific attributes, for instance, a connection of the combination of the specific attributes to specific preference requisite and royalty condition, is inferred or described, it may be used in psychographically clustering consumer groups by products by matching the relationship between consumers' values on products, namely, values of innovation and conservatism, and product attributes to consumers' values, opinions, attitudes, and lifestyles influencing on product preference.

Therefore, the present disclosure can develop an advanced product trend index through the visual narratives by analyzing sales and grasping trends by the consumer groups clustered psychographically, and predict trends of product preference and demand through measurement of inspection of the corresponding index.

That is, the present disclosure can produce customized products by consumer groups and predict demand of the corresponding product when a ratio of the corresponding consumer group clustered psychographically to the population and influx trend and ratio by each cluster are linked to the trend index.

The present disclosure relates to a demand/preference prediction system through a lifestyle map-psychographic profile (visual schema digitization). The present disclosure forms a neural network type lifestyle map through node configuration and digitization of attributes, and operates a demand and trend prediction system through the corresponding lifestyle map.

The present disclosure divides information of visual narrative contents of a product into several genres by the corresponding visual narratives, and replaces the corresponding genre with an area of the lifestyle map.

The present disclosure psychographically describes products necessary for the corresponding area according to consumers' needs and desires, that is, provides a psychographic description on a target audience's needs and desires for products in the lifestyle area. Additionally, the present disclosure follows the trend in growth and decline by lifestyle areas through the trend index calculated by a SNS big data analysis and a realway usage analysis which are analyses relating with consumers' actual use and utilization of the products, and measures market demand through the corresponding trend and a proportion decrease/increase rate in the whole market.

In addition, the present disclosure makes a model for VMD optimization by products and product optimization through the corresponding trend index.

Moreover, the neural network model 133 forms a neural network through the product attributes formed in visual narratives (digitized into visual schemas).

The present disclosure (1) matches the attributes narrated from low-level information to high level information to consumers' psychographic attributes, such as royalty factors and makes an index of the attributes, and (2) quantifies quantitative data of attributes and preference through a prediction modeling of a ranked neural network form in order to form a neural network type map of tastes.

Therefore, the present disclosure can map attributes on the neural network psychographically and grasp consumers' preference and new preference and needs, which will come to the fore in the lifestyle, through the psychographic mapping of the attributes.

The present disclosure dismantles factors of each product, digitizes the corresponding factors to psychographic categories, such as conservatism or innovation, and maps each product into the corresponding psychographic map.

The present disclosure can digitize the corresponding attributes into matrix categories which were used for brand consulting, for instance, categories of composition of stories according to availability of attributes used as moderating variables or parameters.

Major factors of the neural network type lifestyle map are similar to those of a mapping and navigation system.

That is, locations in the lifestyle map correspond to nodes of attributes of each product, and the corresponding attributes belong to meta categories, such as genres.

For example, a pearl button of a specific product has a feminine attribute, a node of the pearl button is located at a numerical value suitable for a recognition cost of "feminine", and such a feminine attribute may belong to a genre called "luxury feminine urban" in the lifestyle map.

Furthermore, a distance between the product attributes is an important factor in the lifestyle map, and such a distance between the product attributes shows how far the distance between specific product attributes is in a consumer's cognitive aspect.

The lifestyle map is made in the form of a neural network. In an aspect of the basic features of the neural network, values of the nodes or connectomes which are combination patterns among the nodes are not fixed, but locations and numerical values of the product attributes (nodes), and distances between the product attributes combined to the product are always varied according to actual combination practices of the product attributes by a product company (brand) and consumers' responses to the practices.

For instance, the pearl button had the feminine attribute two years ago, but is currently tending to increase use for other purposes. People use more of pearl buttons to shirts which are in a "gentle woman" genre rather than to blouses which are in a "luxury feminine urban" genre, so that the location of a pearl button node is getting closer and closer to "sartorial (manish)" from "feminine".

With a change in location of the attribute (node) of the pearl button, a target audience layer that cognitively prefers the feminine attribute of the pearl button is widened to the sartorial (manish) attribute, so that it is measured that the consumers' cognitive preference distance between the pearl button and the sartorial attribute gets narrower.

So, the present disclosure can organize consumers' taste in a bottom-up fashion by quickly measuring changes in location and distance of the product attributes through measurement in a category where the corresponding attributes are applied and utilized.

Such a newly organized category becomes a system that exactly and proactively meets consumers' future tastes and needs.

Therefore, the present disclosure can optimize a combination pattern of product attributes which can proactively respond to the target audience's changing preferences and needs through the neural network type lifestyle map, and can use strategies to form and release products according to such a combination pattern.

The node values of the neural network are managed in link with the trend index in order to quickly change by measuring availability and application cases in the actual lifestyle using SNS big data and the actual distance.

That is, combination kinds and the degree of combination between the attributes which are prerequisites for advancing the pattern which is the connectome between the attributes satisfying the consumers' needs and preference in the neural network are made into a trend index.

Thus, the present disclosure can rapidly and systematically cope with changes in the consumers' needs, and reduce product manufacturing expenses by buying resources (materials for the corresponding product attributes) previously. Additionally, the present disclosure can continuously replicate production of customized products through needs analysis to facilitate companies to carry out sustainable business activities since a contact to satisfy the consumer needs is systemized not in an intermittent flow but in a continuous flow.

In addition, the present disclosure can give a way to a specific region (a specific clustered consumer or market) like a navigation system.

Like a navigation system that measures road traffic conditions in real time to inform a user of the best way to a destination from a specific location, the present disclosure can show how to grasp preference of consumers who are in a specific lifestyle area and how attributes are combined in order to optimize customized products meeting consumer preference according to road conditions, like network patterns and cross hubs, in a metacategory between attributes, namely, in a lifestyle area.

In the neural network lifestyle mapping, product elements forming a specific core (dominant style and genre) existing in the specific lifestyle area occupying a certain psychological space are expressed by nodes, and a neural network type lifestyle map having the configuration of "central part-intermediate part-peripheral part" through cognitively numerical values and locations of the corresponding nodes.

Through such agile management, the present disclosure can show a change in the lifestyle world occupying a certain psychological space and product elements which come up to the central portion from the central portion-peripheral portion or go back to the central-peripheral portion from the central portion, and enables a manager to previously grasp specific consumers' needs, demand and preference through changes in power of influence, location, and size by the lifestyle area.

Moreover, the present disclosure creates a new core while rapidly changing the fence of the corresponding psychological space, and can predict and incubate a new product genre by forming the central portion surrounding such a core.

Therefore, when visualizing a time-sequential trend in the lifestyle world in the preference and analyzing product elements which form the core-central portion-middle portion-peripheral portion of the corresponding lifestyle world, a moving path of the core product category, and a change of the fence, such as overlap and dissolution of each lifestyle world, by the movement of the category, the present disclosure can predict the trend and systemize an algorithm of the core combination pattern among the product elements which form the corresponding trend.

A new center is formed whenever the existing center is dissolved, and such dissolution and reformation of the center are even more important since rarely happening.

Before the center of the lifestyle world moves, there is a severe imbalance in demand and supply at the corresponding center, and there is a symptom that the existing center is already threatened by its influence before the fence moves to a new center.

Of course, a prediction is not made based on predetermined mathematical rules in relation to such a change in center. It is a more effective method to predict the center moving back to the bottom-up and a new center moving toward the bottom-up by grasping and measuring a specific genre considered as to be stable, a composition method used in the specific genre, a symptom threatening influence of product elements, and imbalance in demand and supply.

That is, it is important to observe consumers' material life, namely, a pattern in use of products and to numerically measure the true nature of attributes belonging to the corresponding pattern and a track of the change.

In other words, it is necessary to measure a change in consumer product use patterns and to reform products optimized to the change.

In order to find a pattern, namely, a connectome, in the neural network having a specific feedback loop that organizes products according to material attributes in the neural network and consumers' preference reaction and preference to the attributes, it is necessary to digitize material attributes in the neural network.

As described above, the pattern (algorithm) of the long-term neural network may have a double meaning. That is, the pattern of the long-term neural network means, first, a structure of determining conditions to form consumers' decision-making and preference, and a huge power to make and move the structure (trend and genre style).

That is, a pattern, namely, a connectome, in the neural network having a specific feedback loop that organizes products according to material attributes in the neural network and consumers' preference reaction and preference to the attributes is formed, and the connectome is the structure to determine conditions to form consumers' decision-making and preference and is a huge power to make and move the structure (trend and genre style).

Therefore, when accurately observing and measuring consumer confidence through such a feedback loop, namely, a change in consumer behaviors (UX) in product organization according to material attributes in the neural network and consumers' preference reaction and preference to the attributes, namely, a change in preference reaction to the attributes, the present disclosure can find power which changes and pushes the overall trends, and optimize products (UI) customized to consumer preference on the basis of such a change.

The structure for determining a framework in consumers' behaviors and decision-making is not formed suddenly one day and is not understood by transcendental concepts. Such a structure is formed by manufacturers' efforts and weight to draw the structure customized to consumers' preference through material attributes in the long-term neural network, consumers' reaction in the network to the material attributes, and a response to the consumers' reaction (experiential configuration of the feedback loop).

Therefore, in order to measure the pattern of the neural network through the feedback loop, it is necessary to observe and measure consumers' behaviors, namely, UX. In order to express a moving line of the behaviors into a feedback loop, it is important for consumers to respond to the attributes, and in order to make consumers respond to the attributes, it is necessary to previously systemize the product attributes in psychographically numerical values.

As described above, in the neural information network to supply optimized products through responses to consumers' reactions to product attributes during the consumers' material life, the user can find pattern models of changes and cycles of economic, social and cultural trends carried out in each lifestyle world or area, and through the pattern model made in the neural information network capable of explaining such conjuncture, can maintain the form of the structure as it is and read a long-term movement (a change in trend) revealed by the structure through a diagram of a momentum event that a pattern in a specific lifestyle world is changed while a specific psychological movement is continued for a long time.

An algorithm does not exist in information life or material life, such as the neural network, but metapeotically exists outside the life. Such an algorithm exists not outside but above the pattern of the neural network, and may be a being which controls forms of information or consumers' preference and decision-making, namely, a metapeotic being of the uppermost layer.

Moreover, in the step of predicting demand (S120), the prediction unit 140 carries out an analysis of demand prediction using the visual schema analysis data 30, and creates the prediction data 40 which is an analysis result. As described above, the prediction data 40 is data to predict consumer demand by visual schema of a product.

FIG. 8B is a diagram illustrating a clustering analysis of the visual schema analysis data of the clothing line according to an embodiment of the present disclosure.

The present disclosure clusters products by a relationship pattern among product items (visual schemas) on the basis of consumers' lifestyle area (bubble charts illustrated at the left of FIG. 8B), matches the contents and products to the consumers' values and opinions to the clustered contents and products, namely, the consumers' needs and preference in the lifestyle area, and provides consumers' psychographic description on the product in each area.

Figure 8C:
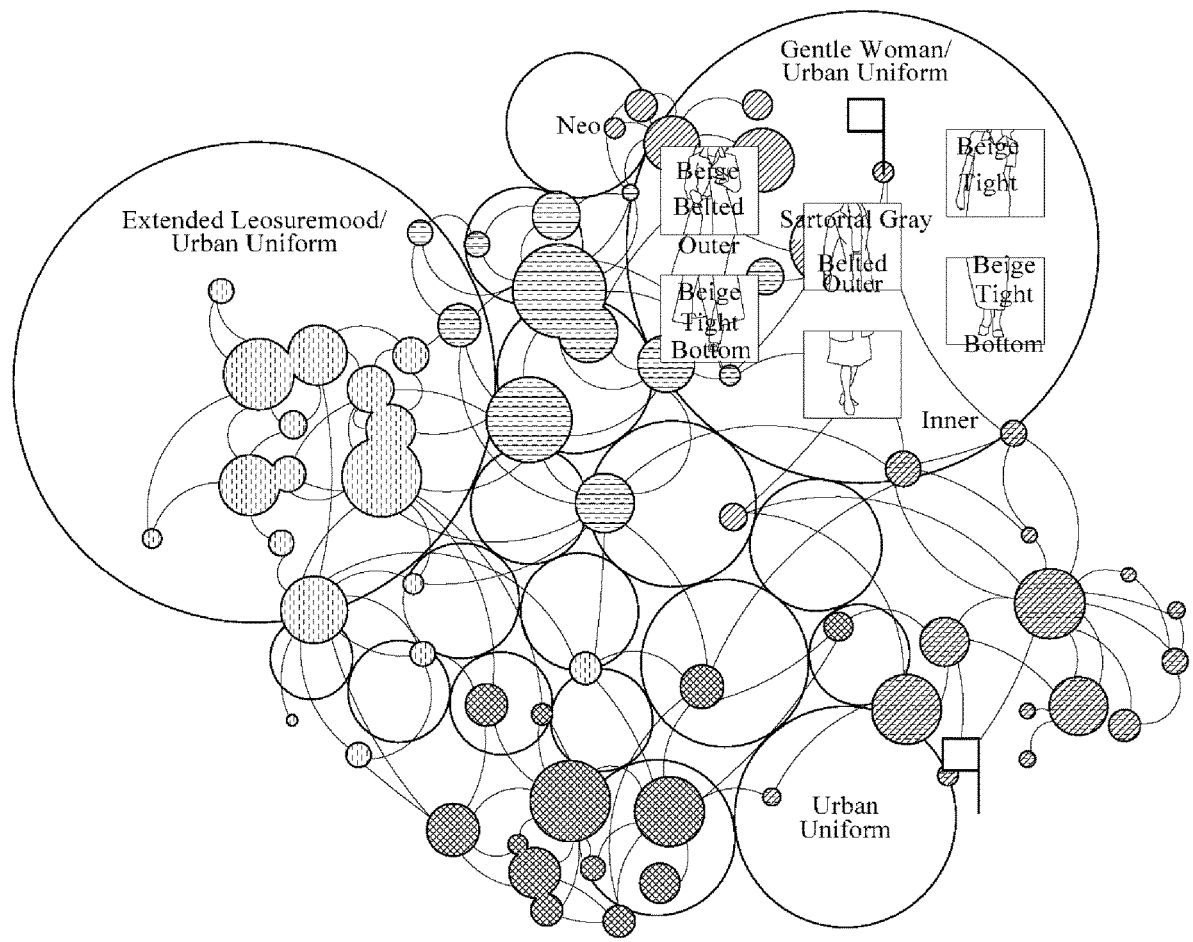
FIG. 8C is a diagram illustrating an analysis of a neural network model of the visual schema analysis data of the clothing line according to an embodiment of the present disclosure.

FIG. 8C is a diagram illustrating an analysis of a neural network model of the visual schema analysis data of the clothing line according to an embodiment of the present disclosure.

The product attributes and consumer preference to the corresponding attributes are formed in the form of a neural network. The corresponding neural network is arranged at coordinates where the consumers' psychographic description on the product, such as innovation, is digitized, and, in the future, learns the optimized matching between the product contents (relationship pattern between the visual schemas) and the consumers' needs and preference to the corresponding contents, which was obtained in the prediction unit, through machine learning of the relationship pattern (connectome) between nodes (clothing schemas), so that a machine can find the optimized matching pattern between the product attributes and specific preference and needs in a consumer's specific lifestyle area through the reinforced connectome.

Thus, the model that the visual narrative illustrated in FIGS. 10A and 10B, namely, the optimized combination pattern between the product items, is changed into the form of a neural network, and the consumer's cognitive cost to the product attributes, which is the basis of digitization of product attributes in the visual narrative, may be replaced with the location of the product attribute at coordinates of the neural network.

As described above, the demand prediction behavior is to make a product model satisfying consumer demand and preference through control and measurement of the corresponding visual schema sequence.

That is, the present disclosure can grasp the optimized connection method (visual schema sequence) of items customized to consumer preference and the item elements (visual schemas) by simulating the consumer's optokinetic behavior to the combination pattern between the product items (visual schemas) among products popular in the specific lifestyle area.

Moreover, the present disclosure measures the consumers' cognitive cost to each product item (visual schema) while simulating the consumer's optokinetic behavior, and finishes description of the visual schema narratives illustrated in FIGS. 10A and 10B.

The present disclosure replaces the visual schema sequence with the combination pattern (connectome) between nodes of the neural network illustrated in FIG. 8C so that the prediction unit can grasp relationship between product items (visual schemas) satisfying he consumers' preference and needs to a specific product and predict future preference and demand.

Figure 9B:
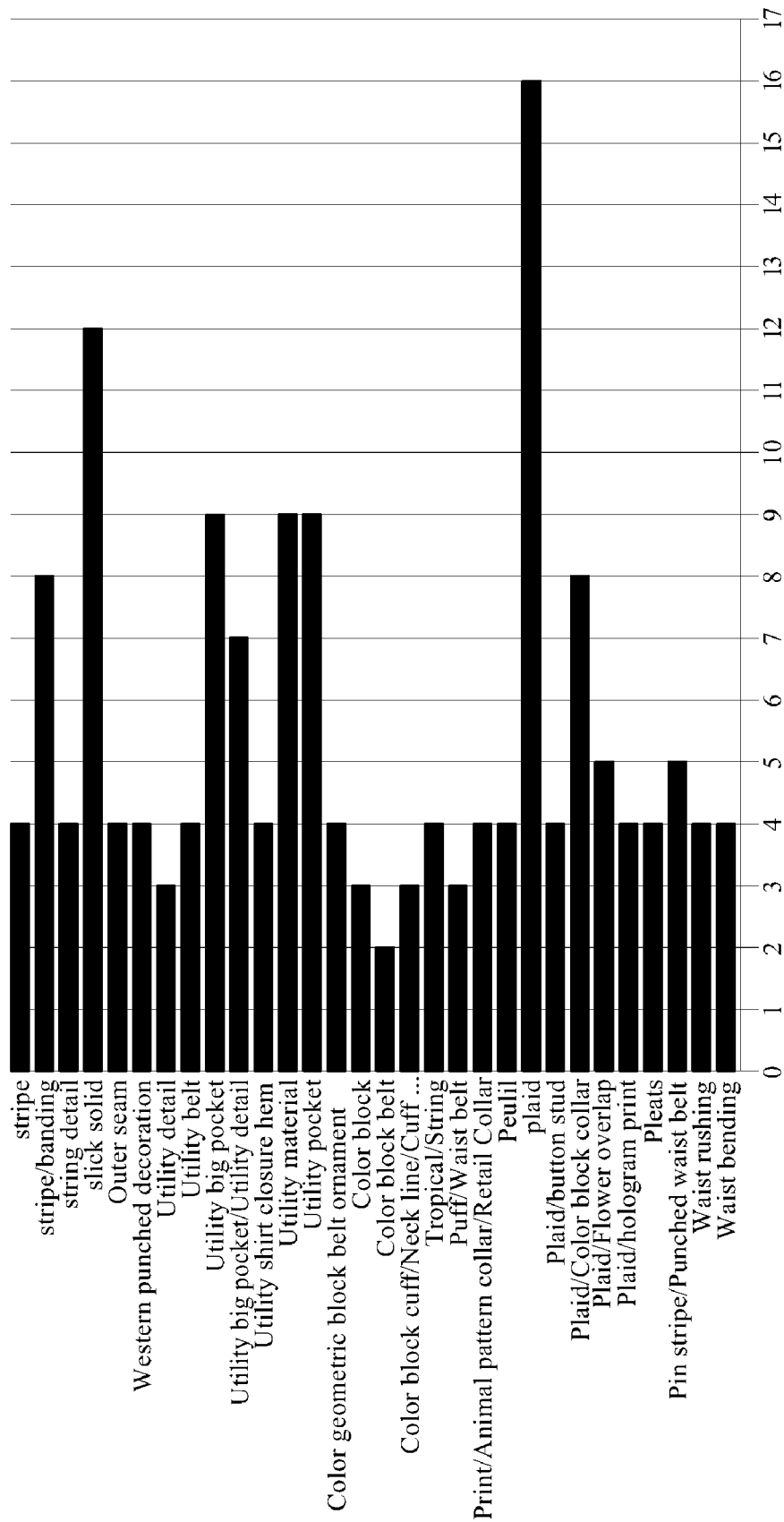

FIGS. 9A and 9B are diagrams illustrating the demand prediction data 40 of the clothing line according to an embodiment of the present disclosure.

Hereinafter, a method that the prediction unit 140 predicts and analyzes demand will be described in detail.

Now, the purpose of a big data analysis is varied from descriptive analytics to predictive analytics.

The predictive analytics means to analyze current and previous factors using various statistic methods including machine learning and predict future events or unknown events. A prediction model in management is to analyze a pattern in the past data and in transaction data and grasp risks and chances.

That is, through the prediction model, companies can develop a system to draw optimization in merchandizing and optimization in business activities through details of dealing and analysis of sales and an advanced CRM-ERP system which is a solution of the corresponding system.

The prediction model explains relationship among lots of factors enabling valuation on risks and potential gains relating to specific condition sets in order to guide decision-making on possible transactions (behaviors).

The predictive analytics gives prediction scores to individuality (customers, health service patients, product SKU, and the likes), determines an extensive organization decision-making process including marketing, credit risk assessment, production, and so on, and has influences on such a decision.

Credit scoring has been the best known, and has been used widely in financial services. A scoring model is to analyze a customer's credit history, loan application, and customer data and to rank customers in sequence by calculating probability that each customer pays credit bills on time.

In an embodiment, the present disclosure expresses relationship between product attributes in visual narratives using a credit scoring model, calculates probability that the corresponding visual narrative satisfies a target audience's preference and demand in each area of the lifestyle map, and ranks it in sequence.

The predictive analytics as one of statistics is used to draw information from data to predict a trend and a behavior pattern. A reinforced prediction web analysis calculates statistical probability relative to future events online. The statistical method of the predictive analytics includes data modeling, machine learning, AI, deep learning algorithm, and data mining.

The core of the predictive analytics is to grasp relationship (matchability) between explanatory variables and predicted variables from known behaviors, for instance, sales and purchase lists, answer details to style quizzes, and so on, and predict a result that has not happened yet using the relationship (matchability of known behaviors).

The predictive analytics mean to predict to an exquisite operation causing trend prediction scores (probability) relative to attributes of each product. Thus, prediction is different from simple forecasting. For example, the predictive analytics is to predict an individual's future behavior and future performance of an individual product to make a better decision by learning through experiences (data).

The predictive analysis process in an embodiment may be formed as follows.

1. Investigation of project: Investigate project results, variables, the scope of efforts, and business purposes, and check data sets to be used.
2. Data collection: Data mining for predictive analysis is to prepare data from various sources for analysis. The data mining provides perfect opinions for customer interaction.
3. Data analysis: Data analysis is to check data with a purpose to find useful information and reach a conclusion, and is a process to perform cleaning and modeling.
4. Statistics: Statistical analysis is to prove a supposition and a hypothesis and test the supposition and the hypothesis using a standard statistic model. (Such a statistical analysis can be achieved through cluster analysis using ML, such as Tensor Flow.)
5. Modeling: Predictive modeling provides ability to automatically create an accurate prediction model of the future, and has options to select the best solution through a multi-mode assessment.
6. Arrangement: Predictive model arrangement provides options to arrange the corresponding analysis results in everyday decision-making process to obtain results, reports and outputs by automatizing decision-making based on the modeling.
7. Model monitoring: Models are managed and monitored in order to assess model performance to prove whether the models provide desired results or not.

The predictive analytics in an embodiment means to predict by giving scores to data through the predictive models.

The prediction unit 140 uses the predictive models for predicting demand. The predictive modeling uses predictive models in order to analyze relationship between specific performance of a unit in a sample and one or more attributes and features of the unit.

It is an object of the predictive models to measure probability that a similar unit in another sample illustrates the specific performance of the unit in the corresponding sample. The predictive models can occasionally carry out calculation even during a real-time transaction. For instance, the predictive models can assess the degree of risk and a chance of a specific customer or transaction in real time in order to make a decision. Development of calculation velocity facilitated execution of the real-time predictive models. Modeling systems of individuality are at a stage of simulating reactions to human behaviors and given responses or scenarios.

In an embodiment, in order to analyze relationship between specific performance of a unit and one or more attributes and features of the unit, samples are clustered through relationship between the attributes. Moreover, as a similarity indicator for the clustering, namely, implicit attributes and contents of each clustered product (relationship between design feature and attribute), a visual narrative system, namely, a method of expressing the relationship between attributes in continuously numerical values, is utilized.

Through the embodiment, the present disclosure can find not superficial similarity used for explicit responses to customers and cooperation filtering but a delicate data pattern through the implicit attributes and contents of the product (relationship between design feature and attribute), and can cluster customers on the basis of the consumer preference to the relationship between design feature and attribute implicit in a specific clustered product model, which is made based on the data pattern.

Finally, the present disclosure can grasp consumer preference implicit in the product through an analysis of sales of the clustered product group.

Now, a procedure for the predictive analysis will be described. First, effective samples having known attributes and known performance are called "training samples". Other samples which are known in attributes but are not known in performance are called "out of training samples (hereinafter, called "out-samples")".

As described above, products with a brand having known performance (sales) become the training samples, and the relationship between design feature and attribute implicit in the product is used as an indicator which can recognize similarity between a training sample unit and an out-sample unit.

In order to immanently analyze consumer preference utilizing the indicator, it is necessary to cluster and analyze SNS big data online and actual wearing styles offline using the corresponding indicator and to form a trend index capable of predicting changes in the target audience's preference and demand.

Using the trend index, a life cycle by categories (subordinated) of products and by attributes (fashion elements) of the corresponding product is checked, and a trend scoring system having optimized combination fashion attributes by seasons and target audience in categories of each product is developed.

A merchandizing system optimized to each brand can be established and a trend can be predicted utilizing the corresponding trend index and the product attribute (fashion element) scoring system. Moreover, the corresponding trend index and the product attribute (fashion element) scoring system enables the user to predict a popularity rating of the present merchandizing and product by brand and to diagnose a reaching-out rate of the target audience.

Furthermore, in the step of describing prediction (S130), the description unit 150 creates a visual narrative data 50 using the prediction data 40 created in the prediction unit 140. As described above, the visual narrative data 50 is data which expresses the prediction data 40 into correlation between products or customers.

After that, the description unit 150 describes a method of creating the visual narrative data 50 using the prediction data 40.

The description unit 150 uses a description model, and the description model is used to classify customers or possibilities into groups and quantifies relations of data. The present disclosure can develop models to optimize merchantability as a product through the corresponding relations.

Differently form the predictive models to predict a specific customer behavior (credit risk or others) or performance of a specific individual unit, the description models can grasp different relations between customers or products.

The description models do not rank customers or products on the basis of a possibility that customers illustrate a specific behavior or that products illustrate specific performance, like the predictive models.

The description models classify customers or products into categories, for instance, according to product preference and life stages.

The description modeling methods may be used to develop high-level models which can simulate and predict large-sized individualized agents.

That is, the description model is to describe segment models by products and by customers on the basis of design features before an analysis of sales, and the predictive model is a scoring system for scoring suitability of fashion elements by specific subordinated types and predicting the degree of popularity of the specific subordination after analyzing sales.

Figure 12:
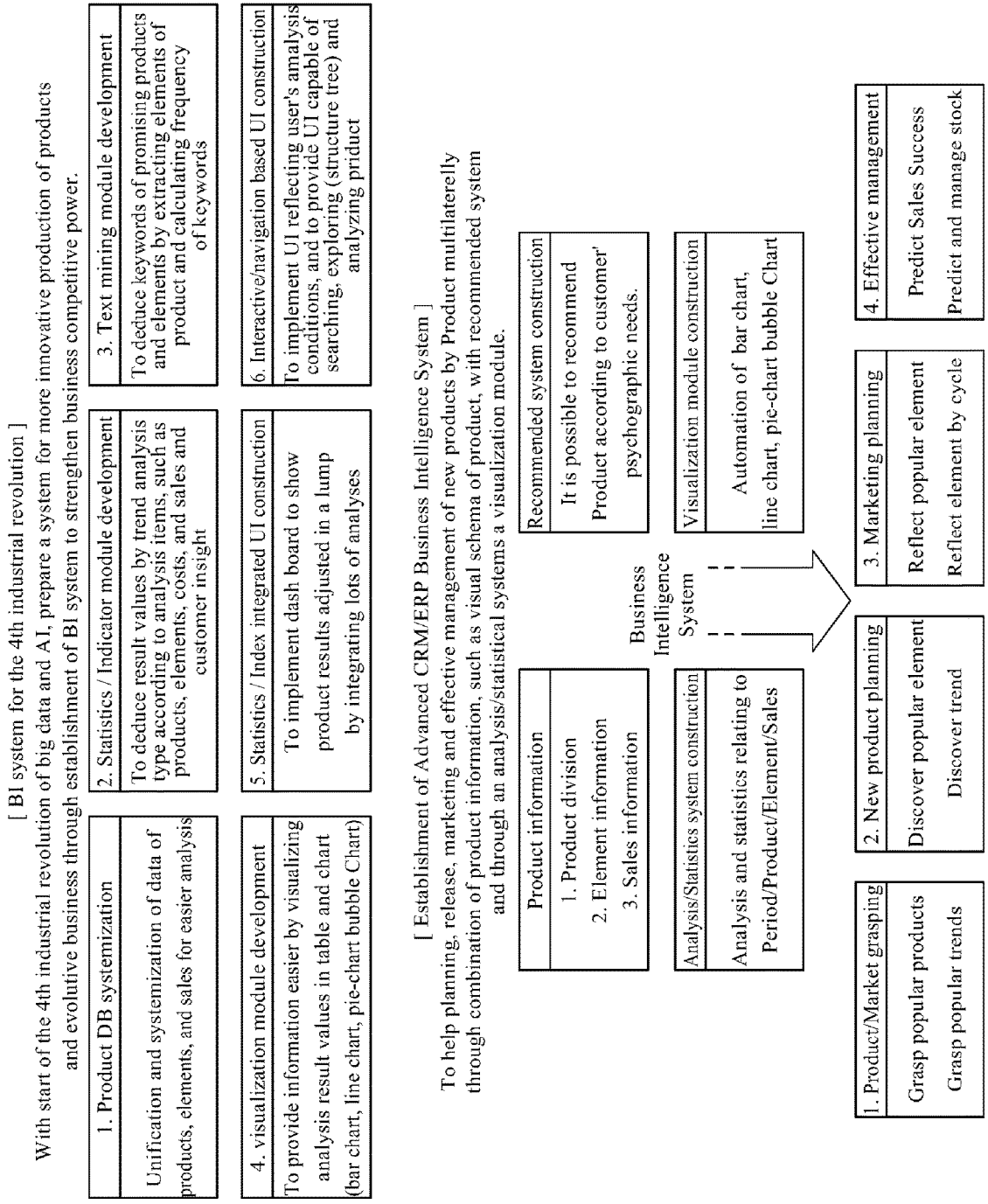
FIG. 12 is a diagram illustrating an advanced CRM/ERP business intelligence system according to an embodiment of the present disclosure.

The description unit 150 is configured to implement a decision-making model, namely, an advanced CRM/ERP system. FIG. 12 illustrates an advanced CRM/ERP business intelligence system according to the present disclosure.

The decision-making model is to describe relations among all elements relating to decision-making, namely, relations among known data, decision-making, predictive results of the decision-making and to predict results of the decision-making includes a lot of variables.

Such models are used to optimize and to make a decision to minimize other results but maximize specific results. The decision-making models are generally used to develop decision-making logics or a series of business rules causing the most suitable behaviors for all customers and situations.

An analytic CRM is a frequent and commercial application of predictive analysis. The predictive analytic methods are applied to generally describe customers and analyze the corresponding consumer chances and risks.

In more detail, the predictive analysis is used for CRM marketing campaigns, sales, customer services, and so on.

CRM tools, namely, a predictive analysis tool of CRM, must understand products which are in high demand or will be higher in future demand, and predict consumer purchasing habits in order to align proper products at a lot of touch points with the customers.

Additionally, the CRM tools must previously identify issues related to risks and chances to maintain the customers and reduce such issues.

An analytic management of customer relationship is applied to a customer lifecycle in all stages to obtain customers, promote relationship with the customers and maintain the customers.

The present disclosure develops the description models to describe models by products on the basis of design features, analyzes sales through the description models, and establishes predictive models to calculate popularity predictivity by specific subordination types and the optimal suitability of fashion elements by the corresponding subordination types.

In addition, the present disclosure tries to develop an analytical CRM tool capable of understanding products and customers through the corresponding design features and consumer preference to the corresponding features, predicting products, which are in high demand or will be higher in future demand, predicting consumer purchasing habits, and systematizing responses optimized to the consumer purchasing habits.

Such methods and approaches are to predict consumer psychological results to the corresponding products on the basis of the contents of attributes implicit in the products, namely, design features, instead of clear expressions of opinions to the products. Such methods are called "implicit measurements".

Such implicit measurements are frequently used as tools for predicting psychological results, for instance, behaviors or decision-making. Furthermore, recently, meta-analyses tend to support predictive legitimacy of such implicit measurements (e.g., Cameron et al., 2012; Greenwald et Al., 2009).

However, in order to justify use of resource-focused duties, researchers pay more attention to independent features of behaviors which are difficult to predict by surface measurement. According to a study by Perugini et al. (2010), it was reported that implicit measurement is better than surface measurement in various aspects including (1) accumulated patterns, (2) double-split patterns, (3) control patterns, and (4) mutual patterns.

The accumulated patterns are involved when implicit/surface measurements of the same variables predict specific results in common. Such cases are revealed when results which are not secured by the surface measurement are obtained.

Therefore, it is the best to explain the accumulated patterns on the basis of description variability. That is, it is good to explain based on how the implicit measurement increases a ratio of description variability of results explained just by the surface measurement.

That is, the implicit measurement is a method for predicting consumer meaningful behaviors or decision-making to products by analyzing patterns relating to products and customers.

The present disclosure clusters the corresponding products by expressing attributes implicit in the products into design features in order to analyze patterns of past data and transaction data.

After that, the present disclosure can predict consumer behaviors and decision-making to the clustered products through the trend index and sales analysis, analyze patterns of the consumer meaningful psychological results (preference and purchasing decision) to the specific clustered products, and make a customer's specific preference model to the specific product.

In other words, the present disclosure replaces implicit attributes of the product with contents to illustrate the consumer preference, clusters consumers and products through a matching pattern between the product contents and the consumer preference to the corresponding contents, and makes a psychographic preference model by the corresponding cluster.

Finally, the present disclosure forms an actual space in a neural network utilizing the concept of reinforced machine learning, and digitizes and optimizes contexts.

Additionally, the present disclosure performs reinforced learning through feedback (degree of sales/degree of trend index) of the corresponding communication like an engine which performs machine learning through communication between a consumer and a provider by the medium of a product, namely, through a feedback loop, in the neural network, and finds combination of specific product attributes suitable for specific context.

In addition, through communication among products, consumers and providers which is a feedback loop in the neural network, the present disclosure forms product attributes and consumer preference to the corresponding attributes in the form of a neural network, and forms a feedback loop through optimization of the combination between attributes of the provider which merchandizes the corresponding preference.

A digitized product model can be made when the attributes of the product are replaced with nodes and numerical values of each attribute are designated by the corresponding node values. Through product sales analysis and trend index measurement, the combined state of the attributes to optimize products can be checked through such a product model. In this instance, the combined state of the attributes can be digitized, measured and visualized by a connectome which is a connection pattern between nodes.

Through the feedback loop in the neural network, complexity of a "symbol phenomenon" which is a process to create a meaning between product attributes and consumer preference is made.

The complexity of the symbol phenomenon is used as a material to make a psychographic model of the target audience's preference to products, and the corresponding material is represented as a pattern of the neural network, namely, connectome.

The present invention relates to a method capable of digitizing attributes of a material in the neural network, so as to find a pattern, namely, a connectome, in a specific neural network by the feedback loop to organize products suitable for consumers' preference and reactions to the attributes of a material in the neural network.

The feedback loop to organize products suitable for attributes of a material in the neural network and consumers' preference and reactions to the attributes forms a pattern, namely, a connectome, in a specific neural network, and the connectome is a structure to determine conditions for consumers' decision-making and preference and is a huge power to make and move the structure (trends, genres, and styles).

The present disclosure includes a method for coding the connectome in the neural network into visual narratives.

The present disclosure provides a theoretical and applicative foundation capable of developing supplementary computer analytic programs, for instance, a series of visual analyzer-meme, which can analyze visual language, grammar, designer intentions (meanings) in space between lines, and psychological features (such as formation of royalty of a customer who reacts to the designer's intention).

In order to make up for the shortages in the quantitative analysis of contents and qualitative analysis of contents, the present disclosure converts qualitative data of context into quantitative data through the method to digitize and sequence the relationship between attributes, and predicts an individual's preference and demand to a product through the corresponding quantitative data.

Now, the method for creating visual narratives will be described.

In order to predict the trend and individualized preference through the psychographic profile of products, it is necessary not to simply recognize attributes of the product but to analyze contents through relationship between attributes of the product.

That is, the feature for contents analysis is relationship between attributes.

Furthermore, the relationship between attributes can be obtained by digitizing and visualizing features, which is a frame to implicitly grasp and measure consumer preference to the corresponding product, of a product by a continuous expression method, such as frequencies, through a difference in numerical values (cognitive costs) of the attributes.

It is the visual narrative method to express the difference in numerical values between product attributes in a continuous form like frequencies.

After that, the visual narrative method is to put products on a lifestyle map (territorialized by product genres based on psychographic preference to the product), to find out a change of the lifestyle in the trend index through a realway usage (analysis of actual use and utilization of the product by a consumer) and a big data analysis, and to predict demand of clothes and products contained in the lifestyle through the corresponding change.

In order to analyze contents of the product using visual narratives, refer to the music contents analysis method and the forthcoming music contents recommendation method. Like music, products can be divided by melodies and genres and can guarantee consistency and regularity in composition and esthetic prediction.

For instance, a single-line scale like Do-Re-Mi-Fa-Sol has no great meaning in music, but there is a commercial value in music when a song is made using the scale.

Even the color theory which is the closest to the visual reference for products illustrates composition using overall harmony. However, there is still a great error that performs prediction just by simple counting of attributes in analyzing products like fashion.

So, in case of fashion and products, it is possible to control and measure a pattern between attributes to optimize products only when consumers' reactions to the corresponding product is characterized by the connection pattern between features and attributes, namely, the sequence of the optimized combination between visual schemas (visual schema sequence) of the product.

So, the wave nature of fashion and products can be developed by the method of calculating psychologically cognitive costs of other fashion and product attributes on the basis of determined numerical values, such as RGBs given to colors. Such a continuous wave is connected to optokinetic motions, so that consumers' preference to the product can be implicitly measured.

The features of the product and the consumer preference clustered by features of the product relating to sales analysis of the product are measured implicitly.

Coding of product contents means that relationship between products is made into waves, and the products are sorted by genres (categories) through coding, and the corresponding genre is replaced with an area of the lifestyle map.

Feature analysis of the present disclosure is a wave that continuously expresses the relationship between product attributes capable of clustering products and customers so that the features can directly perform prediction, and automatically carries out Fourier transformation.

Moreover, UI and UX of the product are divided by the digitized product information, the UI and UX enables production of product information, and it is informed that a specific product belongs to which specific area of the lifestyle map through the corresponding product information.

Through the corresponding feature, a product is digitalized by the method of coding the product, and it is possible to predict and a system for optimization of management/business can be made using the digitalized product information as decision-making data for company management.

FIGS. 10A and 10B are diagrams illustrating visual narratives according to an embodiment of the present disclosure.

To sum up, the method for predicting demand according to an embodiment of the present invention adopts implicit measurement to classify consumers' preference by profiling images through a relational analysis of visual schemas of product images.

The present disclosure can directly classify consumers' preference through the visual analysis of products. So, when the sales data of the corresponding product is linked to image data processing technology, it may be developed to an advanced customer relationship management method that totals sales and automatically performs customer classification and analysis to bring the sales at the same time.

That is, the present disclosure can grasp consumers' preference by the product profiling method through the image processing based on the contents analysis.

In an embodiment, a collaborative filtering based on a consumer's personal information can solve the problem that causes a cold start issue when there is no usage data of a user (consumer), and can strengthen efficiency in consumer profiling and recommendation based on the corresponding consumer information and make up for legal weakness due to reinforcement of the personal information act.

The present disclosure does not recognize schemas of a product as attributes, but makes an algorithm of the structure to learn a design pattern of the corresponding product by artificial intelligence (AI) machine learning through the relation analysis of schemas.

Therefore, the present disclosure is characterized by technology to engineer visual features to use a music discovery algorithm, which is used in music industry, to visual discovery.

That is, the present disclosure uses the method of digitizing relationship of visual schemas and performing numerical analysis using the digitized numerical values by giving cognitive costs corresponding to numerical values designated to the color wheel illustrated in FIGS. 10A and 10B as numerical values designated to the corresponding visual schema.

The present disclosure uses the method of analyzing design patterns based on numerical values designated to the corresponding schemas and using the design patterns as key features in customer analysis and demand prediction of a specific product.

The music discovery algorithm uses pitches as features to analyze a style of the corresponding music because progress of notes can be naturally replaced with time series function to wave.

However, because the image data of visual schemas are not automatically replaced with time series, the algorithm of the present disclosure is characterized in that the image data are replaced with wave data to time series.

The present disclosure adopts the method of replacing the visual schemas of the product data to which a numerical value is given with time series function based on optokinetic motions so as to analyze contents of the product data and deduce an equation relating to consumers' preference and demand prediction based on the contents analysis.

Furthermore, the present disclosure can develop a product planning algorithm to organize products for the next season on the basis of a preference combination by the corresponding schema since being capable of predicting consumers' preference to a product through "preference to a combination by schemas" to which numerical values are designated.

The method of designating numerical values to schemas of product images and featuring a design pattern of the product through a relation analysis by the corresponding schema does not simply use image data and sales data as they are but changes the image data and sales data into specific information capable of analyzing contents of the corresponding data and predicting consumers' preference and demand through connection of data.

That is, the present disclosure adopts an algorithm method of creating new information by connecting image data and sales data through a visual schema relation analysis of product images. In other words, the data modeling method based on feature engineering is characterized by to connect internal data of a company, such as sales data and image data, with external data, such as big data, and replace them with meaningful information for prediction. The method is a data modeling method different from other methods which find weight and association and deduces an equation through regression analysis (statistical method) that simply divides the sales data and the image data into parameters.

Figure 11A:
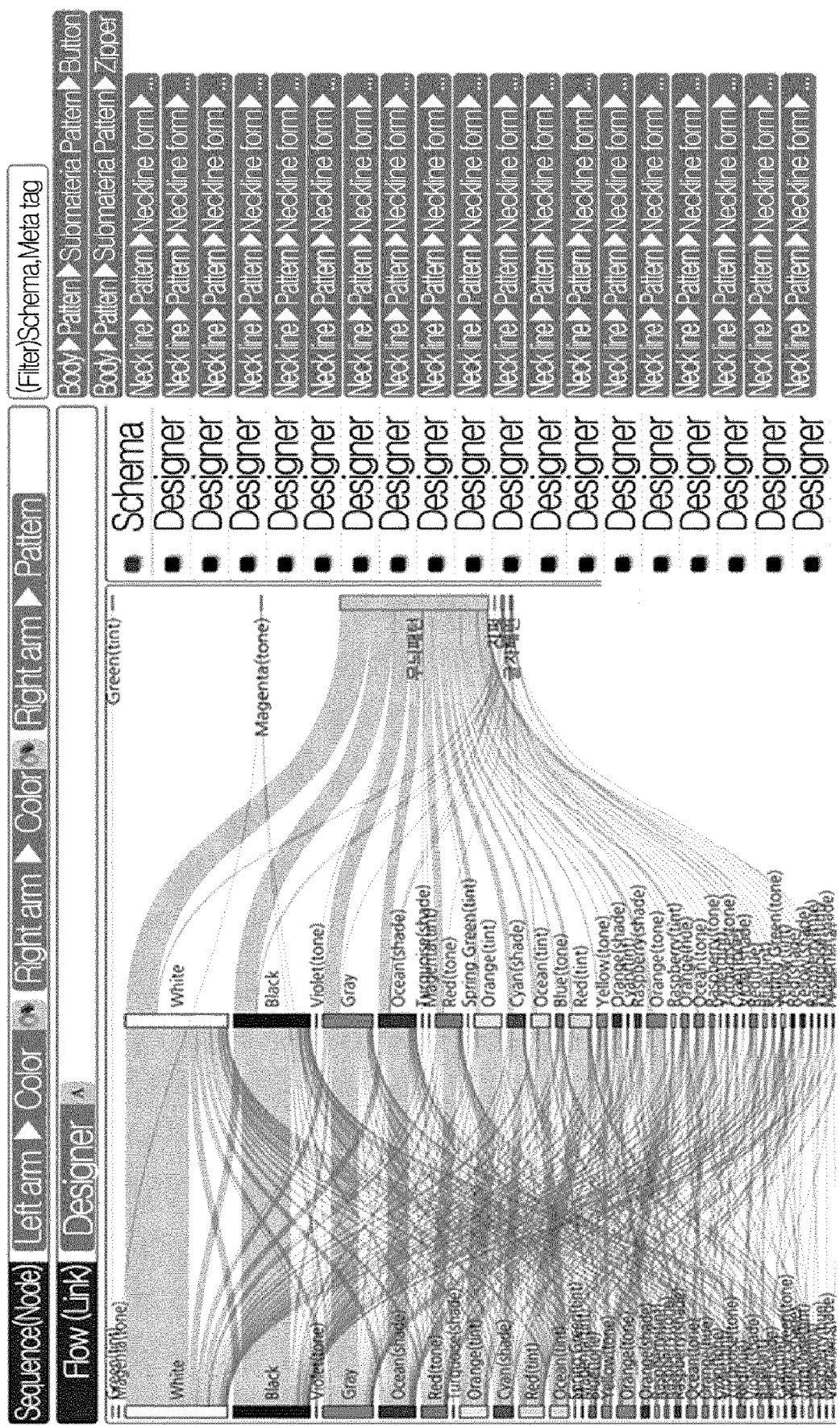
FIGS. 11A and 11B are diagrams illustrating optokinetic processing according to an embodiment of the present disclosure.
Figure 11B:
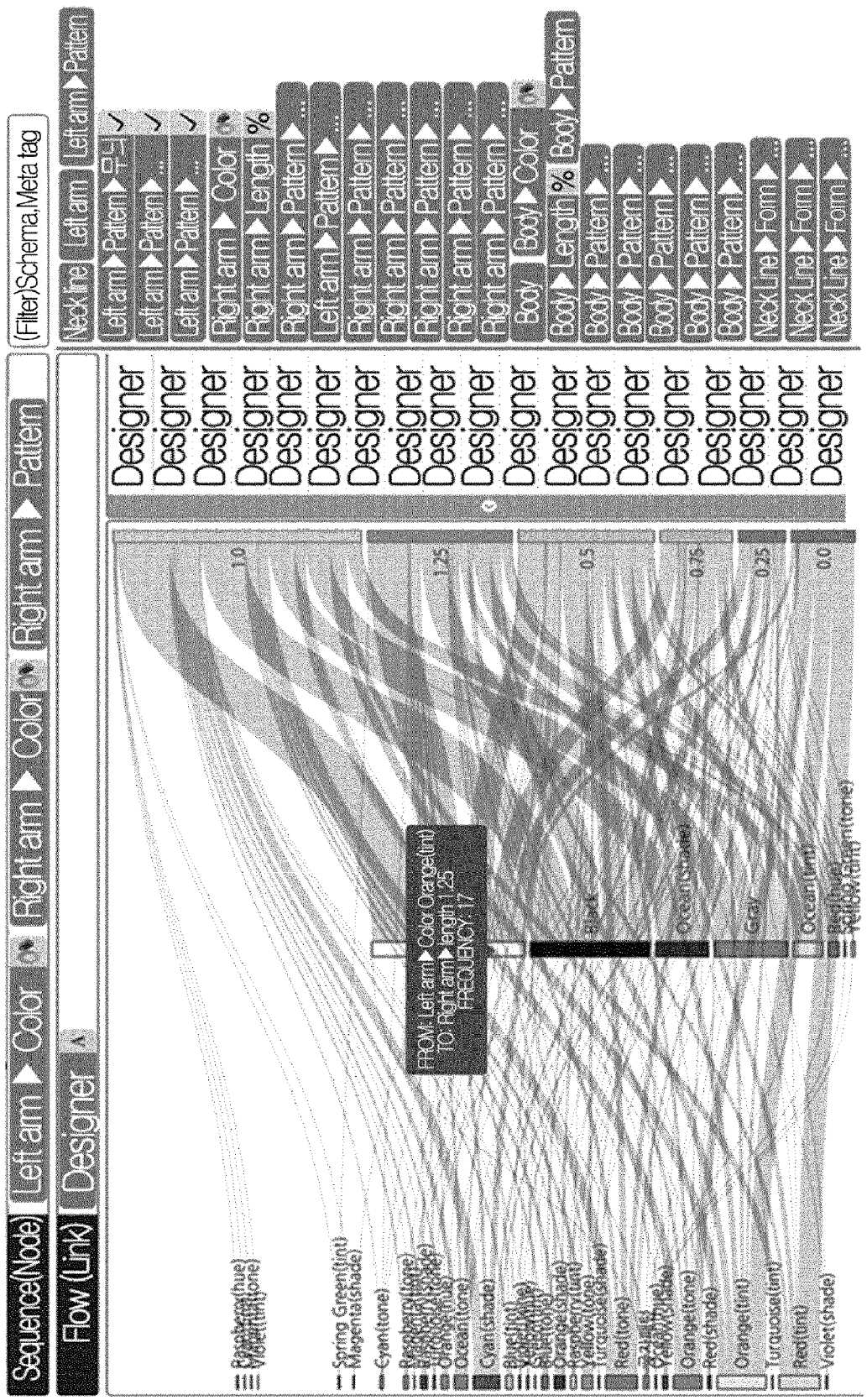

FIGS. 11A and 11B are diagrams illustrating optokinetic processing according to an embodiment of the present disclosure.

The present disclosure can grasp an optimized connection method (visual schema sequence) of items customized to consumers' preference and visual schemas of the items by simulating a consumer's optokinetic processing motions relative to combination patterns among product items (visual schemas) which are popular in a specific lifestyle area. Additionally, the present disclosure measures consumers' cognitive costs to items of each product (visual schemas) while simulating the consumers' optokinetic processing motions, and finishes description of visual schema visual narratives illustrated in FIGS. 10A and 10B. The visual schema sequence is replaced with a combination pattern (connectome) between nodes in the neural network of FIG. 8C, so that the predicting unit according to an embodiment of the present disclosure can grasp relationship between items (visual schemas) of the product satisfying consumers' needs and preference to the specific product and predict future preference and demand.

The present disclosure provides a visual narrative data description model, namely, a product optimization model through control and measurement of items of the product according to the consumer demand and preference. The description model classifies customers in the lifestyle area (each bubble in the bubble chart) on each style map and quantizes relations of data.

That is, the present disclosure subdivides an available area by items into trend areas in consideration of availability in a consumer's lifestyle, and provides a customized model capable of analyzing marketability by styles on the basis of a big data analysis. FIG. 12 is a diagram illustrating an advanced CRM/ERP business intelligence system according to an embodiment of the present disclosure.

The advanced CRM/ERP business intelligence system of a company is established in order to extract a trend index and a consumer insight by performing SNS big data mining of consumers' preference through a combination between a prediction/analysis engine and a text mining module indicated below using the visual schemas of a product and to seek efficiency in a company's business activities (market understanding, product planning, marketing planning, and management efficiency).

Various embodiments described herein may be implemented in a recording medium readable by a computer or similar device using, for example, software, hardware or a combination thereof.

According to a hardware implementation, the embodiments described herein include application specific integrated circuits (ASICs), digital signal processors (DSPs), digital signal processing devices (DSPDs), programmable logic devices (PLDs), field programmable gate arrays (FPGAs), and the like. It may be implemented using at least one of processors, controllers, micro-controllers, microprocessors, and electrical units for performing other functions. The described embodiments may be implemented by the controller 280 itself.

According to the software implementation, embodiments such as the procedures and functions described herein may be implemented as separate software modules. Each of the software modules may perform one or more functions and operations described herein. Software code may be implemented in software applications written in a suitable programming language. The software code may be stored in the memory 260 and executed by the controller 280.

The embodiments described above may be implemented by hardware components, software components, and/or a combination of hardware components and software components. For example, the devices, methods and components described in the embodiments may be implemented using one or more general purpose or special purpose computers, for example, processors, controllers, central processing units (CPUs), graphic processing units (GPUs), arithmetic logic units (ALUs), digital signal processors, microcomputers, field programmable gate arrays (FPGAs), programmable logic units (PLUs), microprocessors, application specific integrated circuits (ASICs), or any other device capable of executing and responding to instructions.

The method according to the embodiment may be embodied in the form of program instructions that can be executed by various computer means and recorded in a computer readable medium. The computer readable medium may include program instructions, data files, data structures, etc. alone or in combination. The program instructions recorded on the media may be those specially designed and constructed for the purposes of the embodiments, or they may be of the kind well-known and available to those having skill in the computer software arts. Examples of computer-readable recording media include magnetic media such as hard disks, floppy disks, and magnetic tape, optical media such as CD-ROMs, DVDs, and magnetic disks, such as floppy disks. Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the embodiments, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components. Or even if replaced or substituted by equivalents, an appropriate result can be achieved. Therefore, other implementations, other embodiments, and equivalents to the claims are within the scope of the claims that follow.

The invention claimed is:

1. A method for predicting demand using visual schemas of a product executed in a demand predicting device, the method comprising:

receiving, from a plurality of consumer terminal devices, product purchase data;

creating, based on the product purchase data, visual schemas in which attributes of a product are digitized;

analyzing the visual schemas and creating visual schema analysis data, which is data expressing a relationship between the attributes of the product and at least one among other attributes, consumers, trends, and costs, by performing a contents analysis action, a clustering action, and a neural network forming action, wherein the neural network forming action forms the attributes of the product and preference to corresponding attributes in the form of a neural network, and creates the neural network includes information regarding complexity between the attributes of the product and the preference;

creating prediction data, which is data obtained as a result of demand prediction analysis by attributes of the product using the visual schema analysis data, by performing:

expressing the relationship between the attributes of the product in visual narratives by applying a credit scoring model to the neural network;

calculating probability of how the visual narratives satisfy each area of a lifestyle map and a target audience's preference and demand; and ranking the calculated probabilities in sequence to predict demand for the product;

creating visual narrative data expressing the prediction data into correlation between products or customers, and describing demand prediction;

transmitting, to a manager terminal device, the prediction data and the visual narrative data; and replacing a relation pattern between the visual schemas in a product optimization model expressed by visual narratives with a combination between nodes of the neural network, and carrying out machine reinforcement learning to learn a consumer's specific preference to a specific product through the relation pattern between the visual schemas.

2. The method of claim 1, wherein the creating the visual schemas comprises recognizing the attributes of the product based on an image analysis model, and creating the visual schemas.

3. The method of claim 2, wherein the describing the demand prediction comprises:

replacing the visual schemas with wave data of time series, and creating the visual narrative data; and converting optokinetic processing into data using sequence nodes of the visual schemas in the image analysis model.

4. The method of claim 3, wherein the describing the demand prediction further comprises making a product model to satisfy consumer demand and preference using control and measurement of the visual schema sequence nodes.

5. A demand predicting device comprising:

a processor configured to:

receive, from a plurality of consumer terminal devices, product purchase data;

create, based on the product purchase data, visual schemas in which attributes of a product are digitized in numerical values;

analyze the visual schemas and creating visual schema analysis data, which is data expressing a relationship between the attributes of the product and at least one among other attributes, consumers, trends, and costs, by performing a contents analysis action, a clustering action, and a neural network forming action, wherein the neural network forming action forms the attributes of the product and preference to corresponding attributes in the form of a neural network, and creates the neural network includes information regarding complexity between the attributes of the product and the preference;

create prediction data, which is data illustrating an analysis result of demand prediction by attributes of the product using the visual schema analysis data, by performing:

expressing the relationship between the attributes of the product in visual narratives by applying a credit scoring model to the neural network;

calculating probability of how the visual narratives satisfy each area of a lifestyle map and a target audience's preference and demand; and ranking the calculated probabilities in sequence to predict demand for the product;

create visual narrative data expressing correlation between products or customers using the prediction data and for describing demand prediction;

transmit, to a manager terminal device, the prediction data and the visual narrative data; and replace a relation pattern between the visual schemas in a product optimization model expressed by visual narratives with a combination between nodes of the neural network, and carry out machine reinforcement learning to learn a consumer's specific preference to a specific product through the relation pattern between the visual schemas.

6. The device according to claim 5, wherein the processor is further configured to recognize attributes of the product based on an image analysis model and creates the visual schemas.

7. The device according to claim 6, wherein the processor is configured to replace the visual schemas with wave data of time series to create the visual narrative data, and converts optokinetic processing into data using sequence nodes of the visual schemas in the image analysis model.

8. The device according to claim 5, wherein the processor is configured to make a product model to satisfy consumer demand and preference using control and measurement of the visual schema sequence nodes.

9. A non-transitory computer readable medium storing a computer program comprising instructions to execute a plurality of processes to predict demand using visual schemas of a product if it is executed by one or more processors, wherein the plurality of processes comprises:

receiving, from a plurality of consumer terminal devices, product purchase data;

creating visual schemas in which attributes of a product are digitized;

analyzing the visual schemas and creating visual schemas which are data expressing a relationship between the attributes of the product and at least one among other attributes, consumers, trends, and costs, by performing a contents analysis action, a clustering action, and a neural network forming action, wherein the neural network forming action forms the attributes of the product and preference to corresponding attributes in the form of a neural network, and creates the neural network includes information regarding complexity between the attributes of the product and the preference;

creating prediction data, which is data illustrating an analysis result of demand prediction by attributes of the product using the visual schema analysis data, by performing:
    expressing the relationship between the attributes of the product in visual narratives by applying a credit scoring model to the neural network;
    calculating probability of how the visual narratives satisfy each area of a lifestyle map and a target audience's preference and demand; and
    ranking the calculated probabilities in sequence to predict demand for the product;
creating visual narrative data expressing correlation between products or customers using the prediction data and for describing demand prediction;
transmitting, to a manager terminal device, the prediction data and the visual narrative data; and
replacing a relation pattern between the visual schemas in a product optimization model expressed by visual narratives with a combination between nodes of the neural network, and carrying out machine reinforcement learning to learn a consumer's specific preference to a specific product through the relation pattern between the visual schemas.

10. The non-transitory computer readable medium according to claim 9, wherein the creating the visual schemas comprises recognizing attributes of the product based on an image analysis model and creating the visual schemas.

11. The non-transitory computer readable medium according to claim 10, wherein the creating the visual narrative data comprises replacing the visual schemas with wave data of time series to create the visual narrative data, and converting optokinetic processing into data using sequence nodes of the visual schemas in the image analysis model.

12. The non-transitory computer readable medium according to claim 11, wherein the creating the visual narrative data comprises making a product model to satisfy consumer demand and preference using control and measurement of the visual schema sequence nodes.

\* \* \* \* \*